United States Patent [19]

Janning

[11] Patent Number: 5,241,923
[45] Date of Patent: Sep. 7, 1993

[54] TRANSPONDER CONTROL OF ANIMAL WHEREABOUTS

[75] Inventor: Eugene A. Janning, Cincinnati, Ohio

[73] Assignee: Pole/Zero Corporation, Cincinnati, Ohio

[21] Appl. No.: 919,147

[22] Filed: Jul. 23, 1992

[51] Int. Cl.⁵ ............................................. A01K 15/02
[52] U.S. Cl. .................... 119/721; 340/573; 119/908; 119/859
[58] Field of Search ................ 119/29, 106; 340/573

[56] References Cited

U.S. PATENT DOCUMENTS

| | | | |
|---|---|---|---|
| 2,774,060 | 12/1956 | Thompson | 340/258 |
| 2,800,104 | 7/1957 | Cameron et al. | 119/29 |
| 3,098,971 | 7/1963 | Richardson | 325/9 |
| 3,493,955 | 2/1970 | Minasy | 340/258 |
| 3,500,373 | 3/1970 | Minasy | 340/258 |
| 3,518,546 | 6/1970 | Augenblick et al. | 325/8 |
| 3,631,442 | 12/1971 | Fearon | 340/258 R |
| 3,631,484 | 12/1971 | Augenblick | 343/6.5 R |
| 3,665,449 | 5/1972 | Elder et al. | 340/280 |
| 3,689,885 | 9/1972 | Kaplan et al. | 340/152 T |
| 3,707,711 | 12/1972 | Cole et al. | 340/280 |
| 3,711,848 | 1/1973 | Martens | 340/280 |
| 3,753,421 | 8/1973 | Peck | 119/29 |
| 3,754,226 | 8/1973 | Fearon | 340/280 |
| 3,820,103 | 6/1974 | Fearon | 340/280 |
| 3,836,842 | 9/1974 | Zimmermann et al. | 324/34 R |
| 3,895,368 | 7/1975 | Gordon et al. | 340/258 C |
| 3,968,272 | 7/1976 | Anand | 427/84 |
| 3,980,051 | 9/1976 | Fury | 119/29 |
| 4,063,229 | 12/1977 | Welsh et al. | 340/280 |
| 4,087,791 | 5/1978 | Lemberger | 340/152 T |
| 4,129,855 | 12/1978 | Rodrian | 340/152 T |
| 4,136,338 | 1/1979 | Antenore | 340/551 |
| 4,262,632 | 4/1981 | Hanton et al. | 119/1 |
| 4,274,089 | 6/1981 | Giles | 340/572 |
| 4,302,846 | 11/1981 | Stephen et al. | 455/19 |
| 4,331,957 | 5/1982 | Enander et al. | 343/6.8 R |
| 4,335,682 | 6/1982 | Gonda et al. | 119/29 |
| 4,399,821 | 8/1983 | Bowers | 128/630 |
| 4,413,254 | 11/1983 | Pinneo et al. | 340/572 |
| 4,471,344 | 9/1984 | Williams | 340/572 |
| 4,503,399 | 3/1985 | Carr | 340/573 |
| 4,510,495 | 4/1985 | Sigrimis et al. | 340/825.54 |
| 4,517,563 | 5/1985 | Diamant | 119/51.02 X |
| 4,618,861 | 10/1986 | Gettens et al. | 340/825.54 |
| 4,642,640 | 2/1987 | Woolsey et al. | 342/42 |
| 4,644,286 | 2/1987 | Torre | 329/50 |
| 4,656,478 | 4/1987 | Leuenberger | 342/51 |
| 4,670,740 | 6/1987 | Herman et al. | 340/572 |
| 4,679,046 | 7/1987 | Curtis et al. | 342/51 |
| 4,733,633 | 3/1988 | Yarnall, Sr. et al. | 119/29 |
| 4,736,207 | 4/1988 | Siikarla et al. | 343/895 |
| 4,745,882 | 5/1988 | Yarnall, Sr. et al. | 119/29 |
| 4,766,847 | 8/1988 | Venczel et al. | 119/29 |
| 4,777,478 | 10/1988 | Hirsch et al. | 340/573 |
| 4,783,646 | 11/1988 | Matsusaki | 340/572 |

(List continued on next page.)

FOREIGN PATENT DOCUMENTS 2455749 10/1981 France .
61-149880 7/1986 Japan .

OTHER PUBLICATIONS

*Antenna Engineering Handbook 2nd Ed.*, pp. 14-24 thru 14-19, publication date unknown.

"Zero Bias Silicon Schottky Barrier Detector Diodes," *M/A-Com Semiconductor Products Operation*, pp. 2-55 thru 2-58.

"Zero Bias Detector Diodes," *M/A-Com Semiconduc-*
(List continued on next page.)

*Primary Examiner*—Robert P. Swiatek
*Attorney, Agent, or Firm*—Ruden, Barnett, McClosky, Smith, Schuster & Russell

[57] ABSTRACT

The whereabouts of a pet or other animal are controlled using one or more transponders to established a boundary. The transponders receive an incident signal from a transmitter and generate a distinguishable return signal which, when the animal moves into proximity of the boundary, is received by a unit affixed to the animal to initiate application of an aversive stimulus which deters the animal from traversing the boundary. The transponders can be active or passive and can be located to establish either fixed or mobile boundaries.

16 Claims, 16 Drawing Sheets

U.S. PATENT DOCUMENTS

| | | | |
|---|---|---|---|
| 4,802,482 | 2/1989 | Gonda et al. | 119/29 |
| 4,814,751 | 3/1989 | Hawkins et al. | 340/573 |
| 4,847,592 | 7/1989 | Hogen Esch et al. | 340/572 |
| 4,885,571 | 12/1989 | Pauley et al. | 340/573 |
| 4,890,111 | 12/1989 | Nicolet et al. | 342/51 |
| 4,898,120 | 2/1990 | Brose | 119/29 |
| 4,910,500 | 3/1990 | Carr | 340/573 |
| 4,918,425 | 4/1990 | Greenberg et al. | 340/539 |
| 4,924,211 | 5/1990 | Davies | 340/573 |
| 4,952,913 | 8/1990 | Pauley et al. | 340/573 |
| 4,967,695 | 11/1990 | Giunta | 119/29 |
| 4,967,696 | 11/1990 | Tobias | 119/29 |
| 4,980,671 | 12/1990 | McCurdy | 340/568 |
| 4,992,794 | 2/1991 | Brouwers | 342/51 |
| 4,996,945 | 3/1991 | Dix, Jr. | 119/29 |
| 5,027,107 | 6/1991 | Matsuno et al. | 340/572 |
| 5,030,940 | 7/1991 | Siikarla | 340/573 |
| 5,054,428 | 10/1991 | Farkus | 119/29 |
| 5,061,918 | 10/1991 | Hunter | 340/573 |
| 5,065,138 | 11/1991 | Lian et al. | 340/572 |
| 5,067,441 | 11/1991 | Weinstein | 119/29 |
| 5,121,711 | 6/1992 | Aine | 119/29 |

OTHER PUBLICATIONS

*tor Products Operation*, pp. 6-93 thru 6-99, publication date unknown.

Brochure entitled "Pet Alert TM Dog and Cat Containment System" by Future-tech, Inc., Columbus, Ohio, publication date unknown.

Brochure entitled "Freedom Fence TM for Dogs" by Freedom Fence TM Inc., North Adams, Mass., publication date unknown.

Training Manual; Dog Guard for the Life of Your Dog, publication date unknown.

Installation Manual; Dog Guard for the Life of Your Dog, publication date unknown.

Leaflet entitled "IF-Invisible Fencing"—The Invisible Fence Co., Cincinnati, Ohio, publication date unknown.

Leaflet entitled "Is Your Dog Important To You?", publication date unknown.

Advertisement for K-9 Hidden Fence, REACH® Magazine, "Reward—Some Dogs Will Stop At Nothing," Dogwatch, Inc., publication date unknown.

Brochure entitled "An Innovative Concept in Fencing," Pet Perimeters, Fenceless Boundary Systems, Hudson, Ohio, publication date unknown.

Brochure entitled "Everyday Reasons to Get Invisible Fencing®," copyright 1990.

Leaflet entitled "The Great Freedom Fence TM Raw Hamburger Test," publication date unknown.

Advertisement "Underground Pet Containment System," publication date unknown.

Brochure, "SAW Delay Lines," Copyright 1988, Sawtek Inc., dated Jan., 1988.

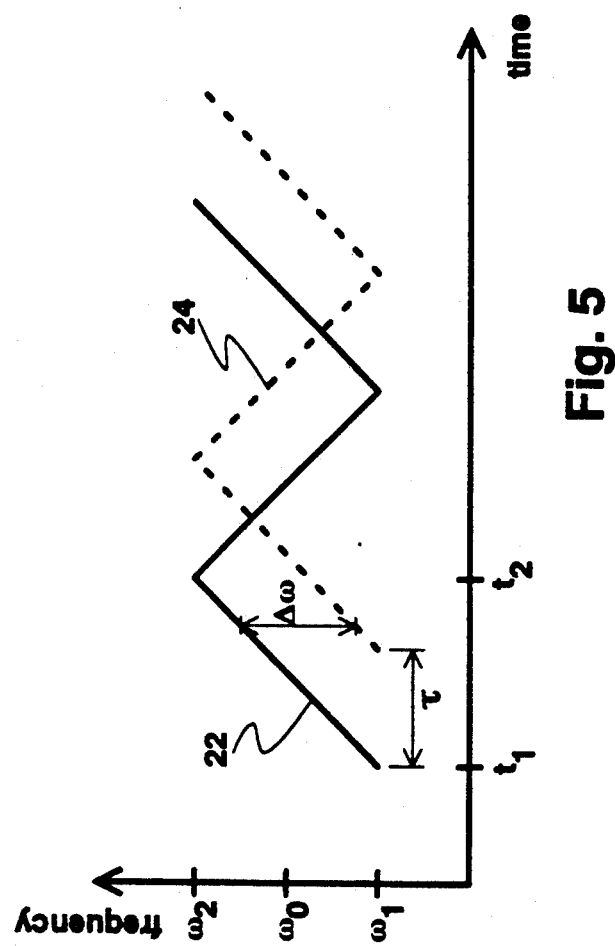

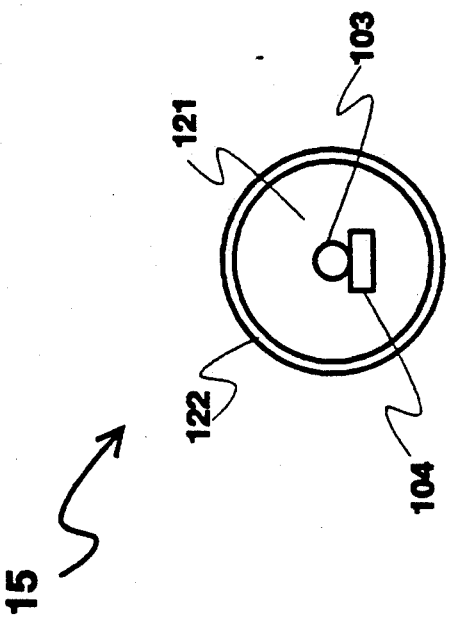
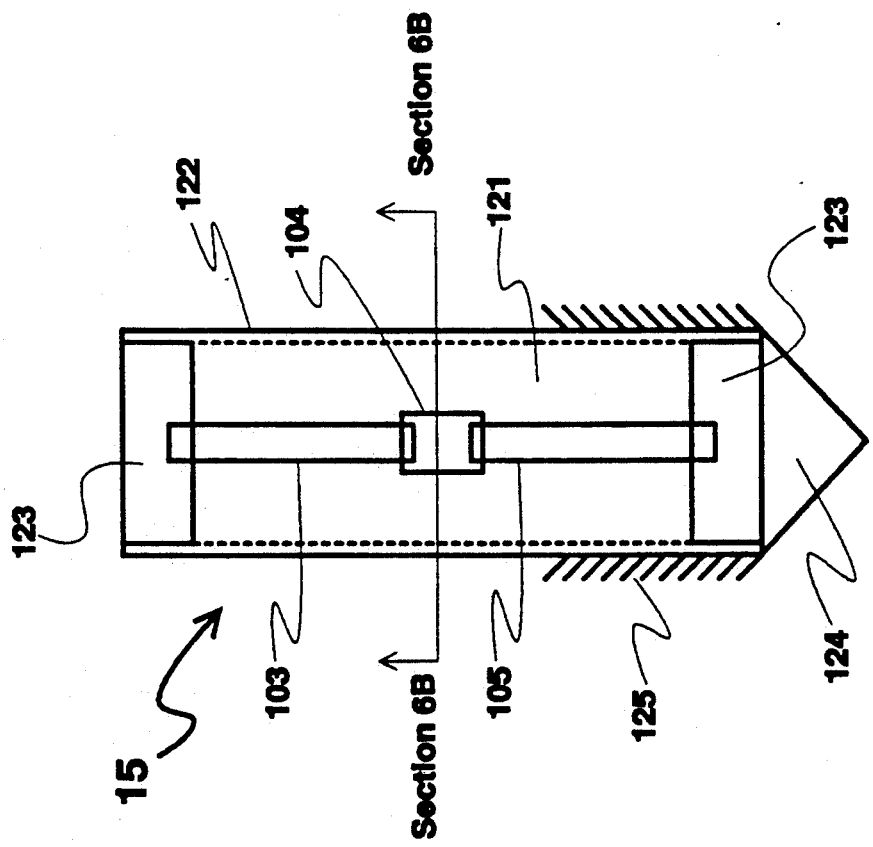

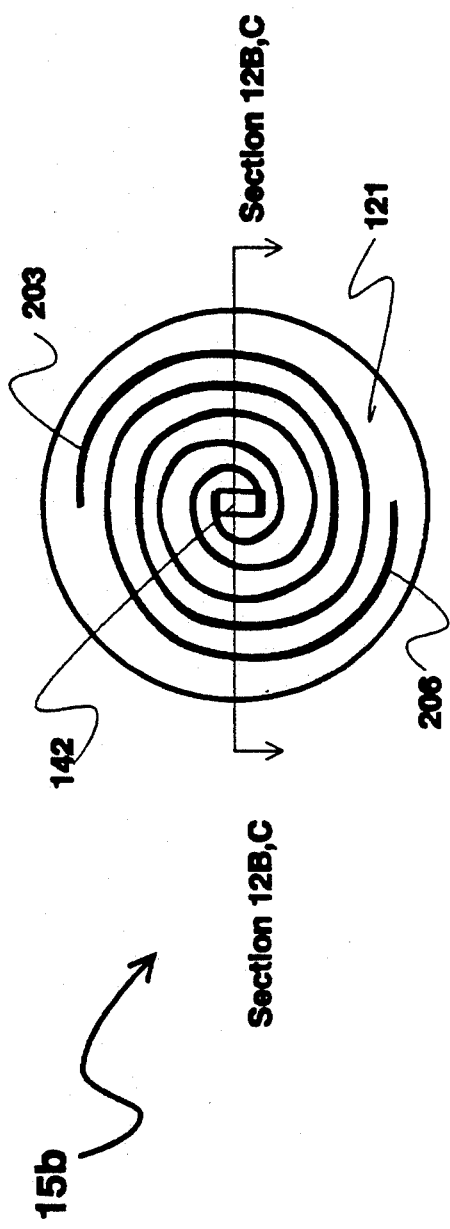
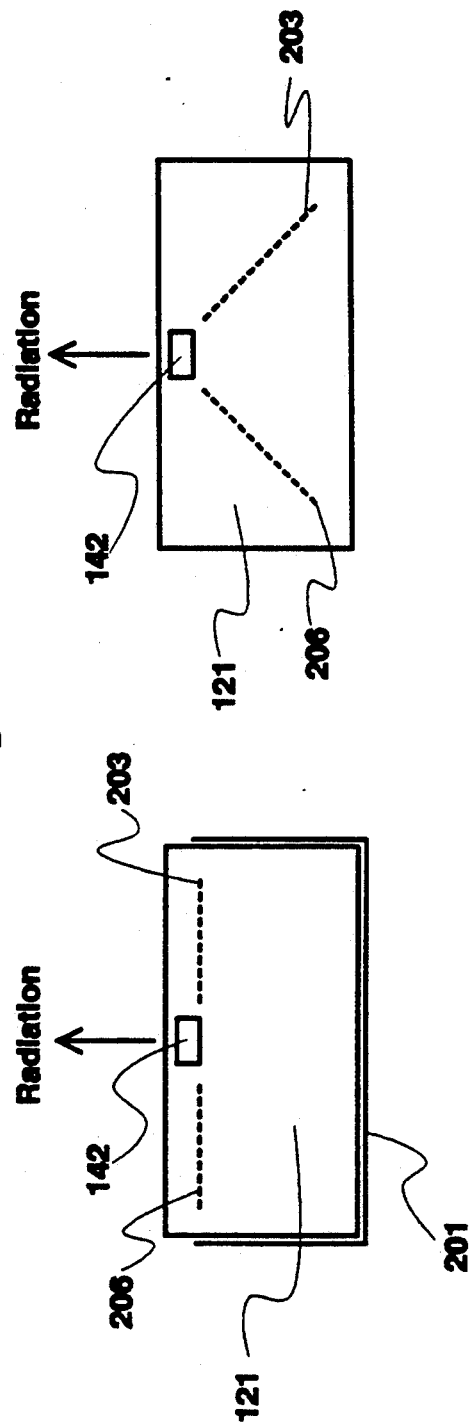
Fig. 12A
Fig. 12B
Fig. 12C

TRANSPONDER CONTROL OF ANIMAL WHEREABOUTS

FIELD OF THE INVENTION

The invention relates to controlling the whereabouts of pets or other animals using one or more transponders to establish a boundary. The transponders receive an incident signal from a transmitter and generate a distinguishable return signal which, when the animal moves into proximity of the boundary, is received by a unit affixed to the animal to initiate application of a stimulus which deters the animal from traversing the boundary.

BACKGROUND OF THE DISCLOSURE

Traditionally, the whereabouts of animals have been controlled by erecting physical barriers such as walls or fences at the site of a boundary the animal is to be prevented from crossing. Such barriers must not only be high enough to prevent the animal from jumping over and dense enough to prevent the animal from passing through any gaps but also substantial enough to withstand attempts by the animal to breach the barrier by physical force. The latter requirement is a serious limitation in that in addition to requiring considerable time and labor to erect, substantial physical barriers are often impracticable due to shortage of materials suitable for their construction.

Those limitations have been overcome to some extent by the development of avoidance-inducing physical barriers, of which, barbed wire and high voltage charged fences are well-known examples. Rather than relying solely on physical strength to defeat attempted breaches, animals quickly learn that contact with such barriers is associated with an aversive stimulus such as being shocked or pricked by sharp barbs. They therefore avoid repeated or sustained attempts to breach them. Physical barriers of the avoidance-inducing type have permitted the fencing of large areas with the expenditure of only a fraction of the time, effort and materials requirements which had previously been necessary. However, avoidance-inducing physical barriers also suffer from some important limitations.

First, like all physical barriers, posts and wires or other above-ground structures are required to erect an avoidance-inducing physical barrier. In some applications, such as the confinement of household pets or guard dogs within a property line, these structures can be unsightly and are sometimes forbidden by deed restrictions or local regulations. Like all physical barriers, avoidance-inducing physical barriers are non-selective. A physical barrier sufficient to control the whereabouts of a particular animal also tends to impede the ingress and egress of persons or other animals except at locations where a gate may be provided. Moreover, the animal can traverse the barrier if the gate is inadvertently left open. Electrified or barbed wire fences intended for controlling the whereabouts of animals can also shock or injure persons, especially young children.

Various electronic systems which do not require the erection of above-ground barrier structures and which are selective in their operation are also known. In these systems, selectivity is achieved by equipping only the animal (or animals) whose whereabouts are to be controlled with an electronic unit capable of sensing when the animal moves into predetermined proximity of a defined boundary and then delivering one or more aversive stimuli to deter the animal from traversing the boundary. Such stimuli commonly comprise an electric shock either alone or in combination with an advance audible tone. Until the advent of the present invention, prior art electronic systems for controlling the whereabouts of animals have generally been one of two basic types which may be referred to as the "wire loop" type and the "remote broadcast" type, respectively.

Various wire loop systems for controlling the whereabouts of animals are exemplified by U.S. Pat. No. 3,753,421 to Peck; U.S. Pat. No. 4,136,338 to Antenore; U.S. Pat. No. 4,733,633 to Yarnall, Sr. et al.; U.S. Pat. No. 4,745,882 to Yarnall, Sr. et al.; U.S. Pat. No. 4,766,847 to Venczel et and U.S. Pat. No. 4,967,695 to Giunta. In such systems, one or more continuous wire loops are routed along an arbitrary path to define a boundary. In some cases the wires are run above ground, in others they are buried. A low level electrical current signal is passed through the loop using a controller connected directly to the loop. The controller itself is typically mounted at an indoor location for protection from the elements as well as for access to an A.C. line from which it derives power. This location can be some distance from the desired boundary. In that case, the wire loop is typically twisted over that portion of its run lying between the controller and the closest point on the boundary.

In operation, the untwisted portions of the wire loop emit a relatively weak electrical field which can be sensed by a battery-powered unit affixed to the animal by suitable means such as by attachment to a collar worn by the animal. When the animal approaches the wire, the unit senses the field and initiates the application of at least one aversive stimulus to the animal. Since the currents in any twisted portions of the wires flow in opposing directions, their fields cancel sufficiently that the unit affixed to the animal does not initiate application of an aversive stimulus even when the animal is near by. Thus, by twisting portions of the loop together, a boundary located remotely from the controller and/or one having two or more distinct portions lying physically separated from one another can be formed using a single loop of wire connected to a single controller.

Some prior art animal whereabouts control systems include an animal-carried stimulator device which are responsive to sensed variations in signal strength as indicating the relative distance of the animal from the boundary. In certain of them, the animal's approach to the wire, as indicated by a received signal strength above a predetermined threshold, initiates application of a first and relatively mild aversive stimulus such as generation of a tone which terminates if the animal retreats from the boundary. If on the other hand, the animal moves closer yet toward the loop, a higher threshold of signal strength is exceeded and a stronger aversive stimulus such as an electric shock is administered in order to repel the animal from the boundary as defined by the location of the wire. While wire-loop type systems have been popular, they too suffer from a number of significant problems.

One problem is that interruption of A.C. power or failure of the controller renders the entire system inoperable. The wiring installation requirements for wire-loop type systems are also a disadvantage. As noted above, a continuous length of wire must be run from the controller, around the desired boundary and back to the controller which is usually located at an indoor location remote from any point on the desired boundary. The wire must be installed around or through any intervening walls or other obstacles. Even with special equipment built for the purpose, it is not a trivial task to bury a wire loop encompassing the perimeter of a large property. In order to cross existing sidewalks, driveways, or other concrete or masonry structures, it may also be necessary to cut through the concrete to provide a channel through which the wiring may be passed. Patches formed over such channels can be unsightly and, if not properly installed, can form areas subject to water infiltration and cracking. In the event the wire loop breaks, the break must be located, excavated and repaired. Until such repair is effected, the entire boundary is disabled, not merely the portion of it in the vicinity of the break in the wire. With buried wire loop systems, reconfiguring the size, shape and/or location of the boundary involves excavating the wire loop and reburying it in a new location or abandoning the existing loop and burying a new one.

Due to the need to twist the loop wires together at locations through which the wires must pass but where no boundary is desired, wire loop systems tend to be difficult to install. This is particularly true in cases where one desires to define boundaries having configurations other than a closed perimeter boundary encompassing an area within which an animal is free to roam. Examples include perimeter boundaries including intentional gaps defining passageways and boundaries including several mutually separated small areas or zones from which the animal is to be excluded.

In order to eliminate the need for boundary wiring, remote broadcast systems for controlling the whereabouts of animals have been proposed. Remote broadcast systems are those in which a perimeter boundary is established by broadcasting a signal from a central location toward an intended outer perimeter boundary. The location of the boundary is defined based on the strength of that broadcast signal as sensed by a unit affixed to the animal. For example, U.S. Pat. No. 5,067,441 to Weinstein describes an animal restraining system including a radio frequency transmitter, a transmitting antenna located inside an area in which the animal is to be restrained and a collar unit worn by the animal. A coaxial cable is run between the transmitter unit and the transmitting antenna. When the animal strays from the transmitting antenna a distance sufficient to permit the signal strength received by the collar unit to fall below a predetermined level, a first aversive of stimulus, such as a beeping tone, is generated. If the animal strays further from the antenna by a distance sufficient to cause the signal strength to fall below a second predetermined threshold, a stronger stimulus such as a shock is administered to the animal to deter its departure from the area. A similar system is described in U.S. Pat. No. 4,898,120 to Brose.

A fundamental shortcoming of remote broadcast type systems for controlling animal whereabouts is that the collar unit worn by the animal does not detect proximity of the animal to a structure whose physical location reliably indicates the location of the intended boundary. Instead, such systems rely on measuring signal strength as an indicator of the distance the animal from a transmitting antenna which may be located a considerable distance from the boundary. Consequently, that indication is not always reliable since the strength of the received signal can change due to constructive and destructive interference generated by signal reflections, shadowing by metallic objects and other uncontrollable variations in local reception conditions. Since local reception conditions can fluctuate, the size, shape and location of the boundary locii at which stimuli will be administered can also fluctuate. For example, if the signal path between the transmitting antenna is temporarily altered by an automobile which pulls into one's driveway, the animal may receive a shock even if the animal remains within an intended perimeter boundary.

Remote broadcast systems are also limited with respect to the sizes and shapes of perimeter boundaries they can define. While generally circular boundaries or ones conforming to the radiation pattern of a particular antenna can be implemented, continuous perimeter boundaries encompassing jutting regions or other well defined irregularities would be extremely difficult, if not impossible to establish using a remote broadcast type system. Another limitation of such systems is that because signal strength values are not unique to individual locations within the field of the transmitter, they are not well suited for excluding an animal only from arbitrarily located distinct positions, such as the site of one's prized rose bush for example. While wire loop systems offer greater flexibility as to boundary shape, they are subject to the problems and limitations described above.

Another limitation of prior art systems is that they are only capable of defining boundaries whose positions remain essentially fixed. There is a need for an animal whereabouts control system which, while suitable of defining fixed boundaries, is also capable of defining boundaries which move with a mobile agent such as a child or another animal so that a particular animal such as a dog can be kept separated from child or other animal while otherwise allowing both dog and child complete freedom of movement.

Prior art systems for controlling the whereabouts of animals also deliver stimuli of substantially invariant intensity. While some systems, such as those described in U.S. Pat. No. 4,898,120 to Brose deliver stimuli whose intensity increases as the animal moves closer to the boundary, small or timid animals are nonetheless administered aversive stimuli of substantially the same intensity as larger or more aggressive animals. At least one system, the PET ALERT buried wire system available from Futuretech, Inc. of Columbus, Ohio, is professedly capable of adjusting stimulus intensity by way of a multiple position switch located at the central control unit. However, in situations where the whereabouts of more than one animal are to be controlled rising a single system, such systems lack the capability permitting a user to independently adjust the intensity of the aversive stimulus to be delivered to each individual animal according to its individual temperament and/or physical characteristics.

As noted above, electronic systems for controlling the whereabouts of an animal typically employ a battery-powered unit affixed to the animal for sensing the boundary and administering a desired stimulus. While battery life of several months is presently achievable using state of the art batteries, achieving even longer operation of such system with state of the art batteries or achieving comparable operating life with less expensive batteries is desired.

SUMMARY OF THE INVENTION

In view of the foregoing problems and limitations of the prior art, it is an object of the present invention to provide a system for controlling the whereabouts of animals which is unobtrusive, selective in operation, which does not require the erection of above ground structures or the installation of wire loops to define a boundary and which is capable of establishing a fixed boundary which remains positionally stable and which can easily be configured and reconfigured to a desired shape and size.

It is a further object of the invention to provide a system having the above advantages which can also establish a movable boundary surrounding a mobile agent such as a child or an animal so that a particular animal can be kept separated from the mobile agent while otherwise allowing both animal and mobile agent complete freedom of movement.

It is a further object of the invention to provide the capability of establishing a movable or fixed boundary which is not rendered entirely ineffective in the event of an A.C. power outage or a failure at a single location on the boundary.

It is a further object of the invention to provide a system having the above advantages which does not require batteries or any other source of power except for a battery in a unit affixed to the animal.

It is yet another object of this invention to provide a system capable of controlling the whereabouts of a plurality of animals and in which the intensity of an aversive stimulus, such as an electric shock, can be adjusted to account for variations in the physical characteristics or temperament of each individual animal so that larger or more aggressive animals can be subjected to more intense stimulation than smaller or more timid animals.

It is a further object of the invention to extend the operating life of systems for controlling the whereabouts of animals between any required battery changes.

In accordance with the invention, there is provided a system for controlling the whereabouts of animals in which a boundary not to be traversed by an animal is established by the location of one or more transponders. The transponders can be placed singly to exclude the animal from a specific location or arranged in mutually spaced arrays to form closed or partially closed continuous perimeter boundaries of virtually any desired size and shape. The transponders can be encapsulated for burial in the earth outdoors or formed in small, thin strips which can be placed beneath carpets or area rugs or near entrances to rooms from which the animal is to be excluded. The transponders may also be provided with adhesive backing or with clips, pins or other attachment devices for securing them at a desired fixed location or to a mobile agent such as a child, an automobile or another animal which one might desire a particular animal to be kept separated from.

The transponders receive an incident signal from a transmitter and generate a distinguishable return signal. The transmitter may form part of a battery-powered unit affixed to the pet by a collar or other suitable attachment. The battery-powered unit affixed to the animal includes a stimulator and a receiver capable of receiving the return signal and detecting a signal strength threshold or other condition of the return signal indicating proximity of the animal to the boundary as defined by the location of at least one of the transponders. The stimulator administers at least one aversive stimulus to the animal when the receiver detects a condition of the return signal indicating proximity of the animal to the boundary as defined by the position of at least one transponder.

A further aspect of the invention contemplates mounting the transmitter at a fixed location remote from a unit affixed to the animal but within range of the most distant transponder in the system. Such an arrangement permits the entire system to be selectively activated or deactivated from a fixed location by switching the transmitter on or off as desired. Locating the transmitter remotely of the unit affixed to the animal also decreases the battery drain on the unit permitting use of a smaller or less expensive battery and/or lengthening the interval between required battery changes. If desired, the remote transmitter can be operated from an A.C. line or other high energy power source. This permits the incident signal to be transmitted at as great a power level as may be desired. Consequently, the return signal generated by the transponders will also be of higher power, thus facilitating reliable detection of the return signal by the unit affixed to the animal. Physical separation of the transmitter from the receiver also lessens the need for filtering or other isolation measures to prevent any spurious signals generated by the transceiver from being erroneously interpreted as return signals.

While active transponders (i.e., ones directly coupled to a battery or other power source) may be used consistently with the broadest aspects of the present invention, a further aspect of the invention contemplates animal whereabouts control using passive transponders such as those commonly affixed to merchandise for purposes of theft prevention. As used herein, the term "passive" refers to a transponder which requires neither a battery or other self-contained local power source nor any wired connection to any external power source. Such passive transponders may be formed of a nonlinear element such as a diode or varactor coupled to at least one antenna suitable for receiving the interrogating signal and radiating the return signal with acceptable efficiency. In such case, the return signal may suitably comprise one or more harmonics or subharmonics of a simple fixed frequency incident signal. Alternatively, the incident signal may take the form of a double sideband amplitude modulated signal with or without carrier.

In lieu of passive transponders incorporating a nonlinear element, a further aspect of the invention contemplates a passive transponder system for controlling animal whereabouts utilizing a transceiver affixed to the animal and at least one boundary-defining passive transponder incorporating a reflective delay line for receiving an incident signal from the transceiver and generating a return signal in the form of a predeterminately time-delayed reflection of the incident signal. A desired aversive stimulus is generated when the animal moves sufficiently close to a transponder that the transceiver receives a return signal in the form of a predeterminantly delayed reflection of the incident signal. By providing transponders characterized by differing predetermined delays, different boundary constraints can readily be imposed on the whereabouts of different animals. For example, by means of passive transponders and transceivers operating according to different predetermined time delays, the whereabouts of one pet animal can be constrained by one or more boundaries differing in whole or in part from any boundaries constraining the whereabouts of a second pet animal. To further avoid the possibility of falsing, the delay line of the passive transponder may comprise an encoded surface acoustical wave (SAW) device with the transceiver being equipped with complementary decoding logic so that signals not properly encoded will not initiate stimulation of the animal.

In order to conserve battery power and thus extend the operating time of the system between required battery replacements, a further aspect of the invention contemplates providing the unit affixed to the animal a power management system including a motion detector and timer for selectively deenergizing at least a portion of the circuitry of the unit in response to sensing persistent inactivity of the animal.

In accordance with yet another important aspect of the invention, the unit affixed to the animal is provided with a user-accessible adjustor of stimulus intensity. This permits the intensity of the applied aversive stimulus to be adjusted according to the physical characteristics and/or the temperament of each individual animal whose whereabouts are to be controlled.

These and other aspects and advantages of the invention will become more apparent to the person of ordinary skill in the art upon review of the following detailed description taken in conjunction with the appended drawings in which like reference numerals designate like items.

BRIEF DESCRIPTION OF THE DRAWINGS

FIG. 5 is a graph illustrating operation of the reflective signalling subsystem of FIG. 4.

FIG. 6A is a diagrammatic plan view of a narrowband nonlinear passive transponder with a planar dipole antenna suitable for use with the reflective signalling subsystem shown in FIG. 4.

FIG. 6B is a diagrammatic side sectional view taken along line 6B—6B of FIG. 6A.

FIG. 12A is a diagrammatic plan view of a broadband nonlinear passive transponder suitable for use with the harmonic and subharmonic signalling subsystems shown in FIGS. 8, 9, 10 and 11.

FIG. 12B is a diagrammatic side sectional view taken along line 12BC—12BC of FIG. 12A illustrating a broadband nonlinear passive transponder according to FIG. 12A incorporating a planar two-armed archimedian spiral antenna.

FIG. 12C is a diagrammatic side sectional view taken along line 12BC—12BC of FIG. 12A illustrating an alternative form of the transponder of FIG. 12A incorporating a conical spiral antenna.

DETAILED DESCRIPTION OF THE DRAWINGS

Figure 1:
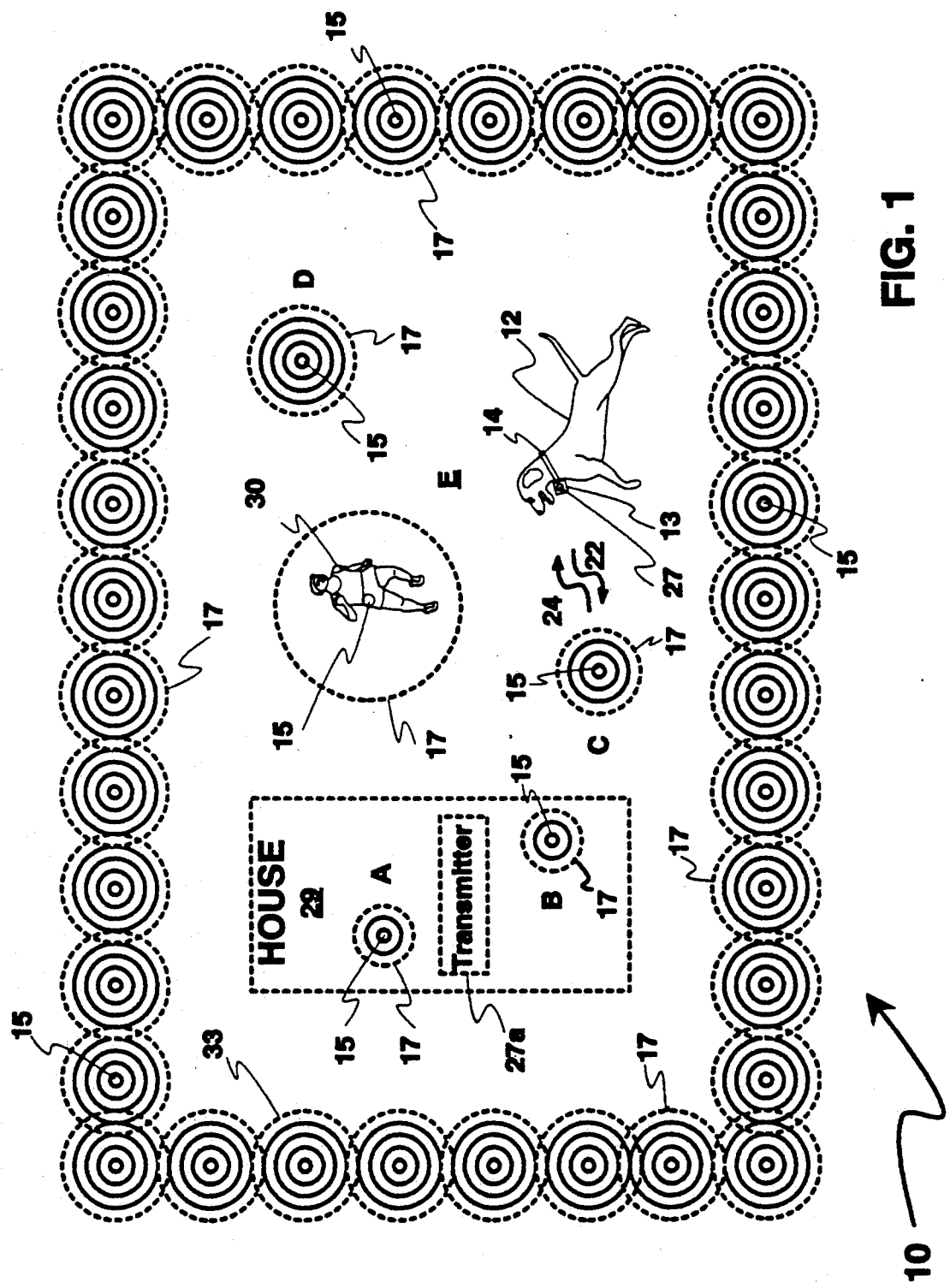
FIG. 1 is a schematic diagram illustrating two alternative embodiments of an installed transponder system for controlling the whereabouts of animals in accordance with the invention.

Referring to FIG. 1, there is illustrated an installed transponder system 10 for controlling the whereabouts of an animal 12 in accordance with the principles of the present invention. System 10 includes a unit 13 affixed to animal 12 by a collar 14 or other suitable attachment and further includes one or more transponders 15, each of which electronically establishes a boundary 17 which generally surrounds each transponder 15. Each transponder 15 is capable of receiving an incident signal 22 and, in response to incident signal 22, generating and transmitting a distinguishable return signal 24 capable of being received by unit 13. Incident signal 22 may be transmitted either by a transmitter 27 associated with unit 13 or, alternatively, by a remotely located transmitter 27a. When animal 12 moves into sufficiently close proximity of any transponder 15 that the return signal 24 transmitted by that transponder 15 is received by unit 13 and satisfies at least one predetermined criterion, such as exceeding a predetermined received signal strength, unit 13 responds by causing at least one aversive stimulus, such as an electric shock, to be administered to animal 12 to deter the animal 12 from traversing the boundary 17.

As FIG. 1 shows, transponders 15 may be positioned at desired locations within a house 29 or other structure so as to exclude animal 12 from specific locations therein, such as depicted locations A and B. Those indoor locations may correspond, for example, to the locations of such items as a particular room, a rug or a piece of furniture. In addition or in the alternative, one or more transponders 15 may be positioned to establish boundaries 17 at desired discrete fixed outdoor locations, such as the locations C and D indicated in FIG. 1. Transponders 15 can also be affixed to a mobile agent such as an automobile, another animal or a child 30 which animal 12 is to be deterred from approaching. By placing a plurality of transducers 15 in an open or closed array, such that at least a portion of the boundaries 17 associated with adjacent transponders 15 at least partially overlap one another, continuous open or closed perimeter boundaries of virtually any desired shape and size, such as the rectangular closed perimeter boundary 33 illustrated in FIG. 1 can also readily be formed for purposes of confining animal 12 within an area E. Animal 12 may thus roam freely within area E except for locations where its passage may be forbidden by any interior boundaries 17 such as those established by the transponders 15 present at indoor locations A and B, at outdoor locations C and D of FIG. 1, or those attached to a mobile agent such as child 30.

Transponders 15, particularly those intended for outdoor use, are preferably encased in potting compound, encapsulated in plastic or otherwise suitably protected from the elements. Suitably protected transducers 15 may be used in above-ground exterior applications or may be buried a few inches below the surface of the earth. Burial of transponders 15 has several advantages including maintaining them in a fixed position, protecting them from mechanical damage and providing a more stable operating environment.

Figure 2:
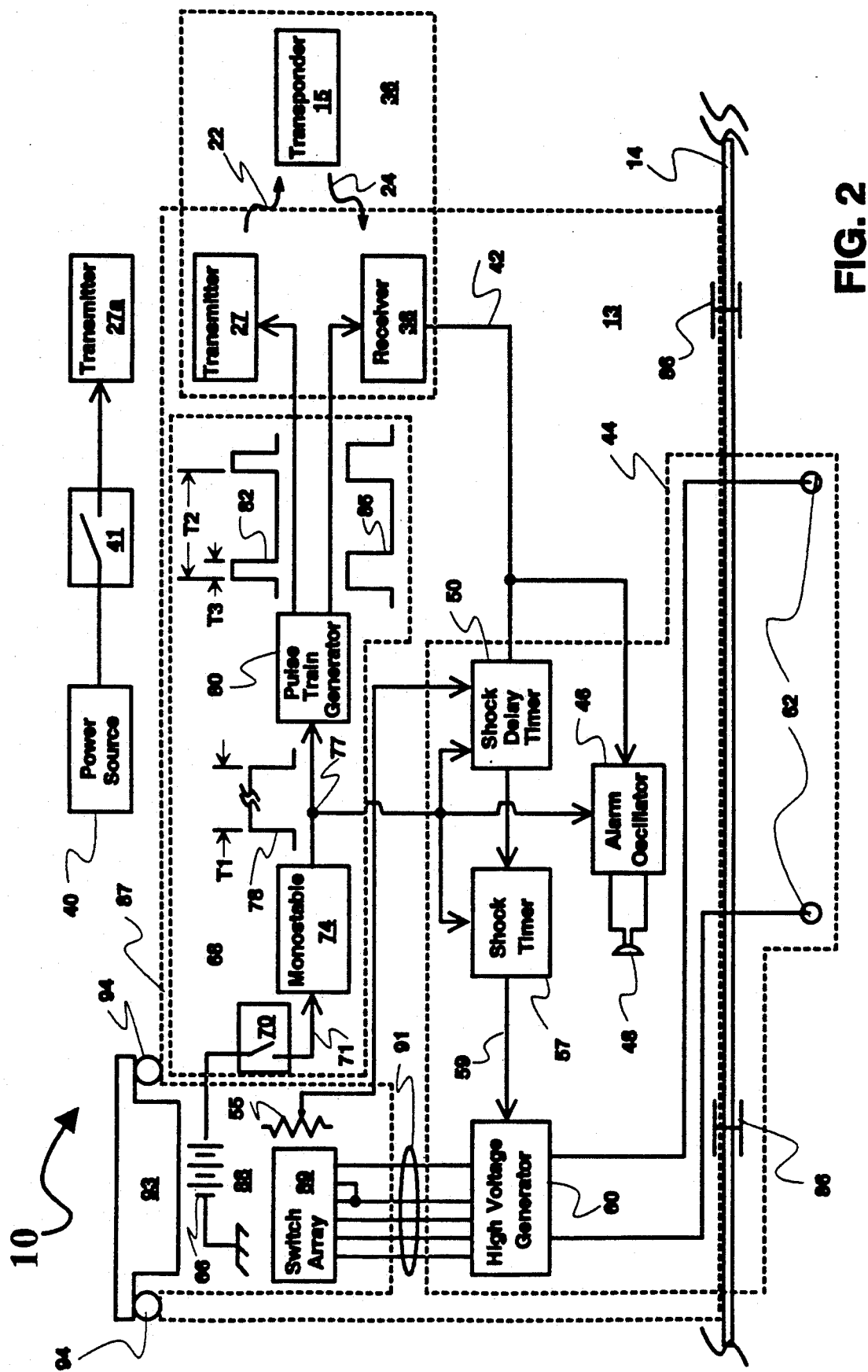
FIG. 2 is a block diagram illustrating the components of the system of FIG. 1 in further detail.

As illustrated in FIG. 2, system 10 includes a signalling subsystem 36 comprising at least one transponder 15, a transmitter 27 or 27a for transmitting an incident signal 22 and a receiver 38 for receiving return signal 24 from transponder 15. Transmitter 27 and receiver 38 may each form part of the battery-powered unit 13 affixed to animal 12. Alternatively, a transmitter 27a may be located at a remote, fixed location lying such that every transponder 15 in system 10 is within range of incident signal 22. A remote transmitter 27a may be supplied power from the A.C. line or other suitable power source 40, with or without battery backup for power failure protection as may be desired.

Utilizing a remote transmitter 27a offers a number of advantages. First, a switch 41 or other control device may readily be provided for selectively turning system 10 on and off from a central location such as house 29. Elimination of transmitter 27 lessens the power consumption of unit 13 and, since a remote transmitter 27a need not be portable or rely on a battery power source, a remote transmitter 27a affords the opportunity to broadcast incident signal 22 at a higher power level. This permits the return signal 24 generated by transponder 15 to also be of a higher power level, thus facilitating reliable detection of the boundary 17 established by each transponder 15 by the unit 13 affixed to animal 12. Remotely locating transmitter 27a also alleviates the need for precision filtering, isolation or other conventional measures which might be necessary or desirable to prevent receiver 38 from erroneously interpreting noise generated by transmitter 27a as being a return signal 24 from a transponder 15.

Receiver 38 preferably generates a digital output signal 42. Signal 42 normally assumes a logical "0" or inactive state when no return signal 24 is detected. Signal 42 assumes a logical "1" or active state whenever return signal 24 satisfies at least one predetermined criterion such as exceeding a predetermined received signal strength threshold. When animal 12 moves into sufficiently close proximity of a transponder 15 that return signal 24 satisfies that criterion, signal 42 causes at least one aversive stimulus to be administered to animal 12 by a stimulator 44 whose structure and operation will now be described with continued reference to FIG. 2.

Stimulator 44 includes an alarm oscillator 46 coupled to a sonic transducer 48 which is activated and delivers a sonic stimulus to animal 12 immediately upon the activation of digital signal 42. At the same time, signal 42 activates a shock delay timer 50 which affords animal 12 a period of time, such as about three to ten seconds, within which to withdraw from proximity of transducer 15 without receiving a shock. Assuming animal 12 withdraws a sufficient distance from the nearest transponder 15 that receiver 38 indicates that the signal strength threshold or other predetermined criteria concerning return signal 24 is no longer satisfied, signal 42 is deactivated, thus terminating delivery of the sonic stimulus by transducer 48 and resetting shock delay timer 50. Preferably, shock delay timer 50 is provided with a potentiometer 55, or other suitable control device, permitting a user to adjust the withdrawal time period determined by shock delay timer 50.

In the event animal 12 fails to withdraw from proximity of any transducer 15 a distance sufficient to cause signal 42 to be deactivated before shock delay timer 50 times out, shock delay timer 50 activates a shock timer 57 whose output 59 is immediately activated thereby energizing a high voltage generator 60 which delivers to animal 12 by way of a pair of mutually spaced electrodes 62, an additional aversive stimulus in the form of an electrical shock. Electrodes 62 are held in contact with the skin of animal 12 by the collar 14 affixing unit 13 to animal 12. If animal 12 withdraws sufficiently from the nearest transducer 15 in the manner described above, resetting of the shock delay timer 50 resets shock timer 57 thereby immediately deenergizing high voltage generator 60 and terminating delivery of the shock. To avoid the possibility of cruelty to animal 12, shock timer 57 automatically times out after a predetermined period of time, such as five to ten (5–10) seconds after any shock is initiated. Thus, animal 12 will not be traumatized if for any reason animal 12 does not or is unable to withdraw a distance from the nearest transducer 15 sufficient to terminate the shock by the animal's own volition.

All circuitry forming a part of unit 13, including receiver 38, and stimulator 44 are powered by at least one battery 66. In order to prolong the life of battery 66 an important aspect of the invention contemplates providing unit 13 with a power management system 68 which deactivates at least a portion of the circuitry of unit 13 when animal 12 is physically inactive. In the preferred embodiment, power management system 68 includes a motion switch 70 or other suitable motion detector responsive to motive activity of animal 12 by virtue of its attachment to the animal via collar 14. Motion switch 70 is coupled to the trigger input 71 of a monostable multivibrator 74 which generates and applies to a bus 77 a sustained energization pulse 78 of time interval $T_1$. So long as motive activity of animal 12 persists or resumes prior to the end of interval $T_1$, monostable 74 maintains bus 77 in an energized state. As illustrated, bus 77 supplies power to shock timer 57, shock delay timer 50, and alarm oscillator 46. Consequently, during periods of inactivity of animal 12 persisting longer than interval $T_1$, all circuitry associated with stimulator 44 is deenergized thereby conserving battery 66.

In order to even further conserve battery 66, power management system 68 preferably operates transmitter 27 and receiver 38 in synchronism with one another on a low duty cycle basis such that transmitter 27 and receiver 38 are deenergized, and thus do not drain battery 68, for a significantly greater portion of the time than they are energized while system 10 is operating. To achieve this, power management system 66 includes a pulse train generator 80 having an input coupled to bus 77 and a pair of outputs 83 and 84 coupled to transmitter 27 and receiver 38, respectively. So long as bus 77 remains energized, pulse train generator 80 applies a pulse train 82 of period $T_2$ to transmitter 27 for intervals $T_3$ which make up about one tenth or less of period $T_2$. To ensure reliable detection of return signal 24, pulse train generator 80 also generates and applies to receiver 38 a second pulse train 85 whose pulses have a rising edge occurring slightly prior to the rising edges of pulse train 82 and a falling edge occurring slightly after the falling edges of pulse train 82.

Unit 13 is encased by a housing 87 which is preferably formed of a tough plastic material by injection molding or other suitable process. Housing 87 includes an interior compartment 88 containing battery 66, as well as a user-accessible dual in-line packaged (DIP) switch array 89 connected to the high voltage generator 60 of stimulator 44 by a series of lines 91. To permit a user of system 10 to gain access to switch array 89 and battery 66, compartment 88 is fitted with a removable cap 93 provided with an O-ring 94 or other suitable seal to prevent entry of moisture or contaminants. Preferably, potentiometer 55 is also mounted interiorly of compartment 88 to permit a user to adjust the length of the time delay within which animal 12 may withdraw from boundary 17 after receiving a sonic stimulus before receiving an electric shock.

According to another aspect of the invention, system 10 is provided with a control circuit permitting the intensity of an aversive stimulus delivered to animal 12 to be adjusted to account for variations in the physical characteristics or temperament of each individual animal 12 whose whereabouts are controlled by system 10. A preferred form of such a control circuit will now be described in further detail with reference to FIG. 3.

Figure 3:
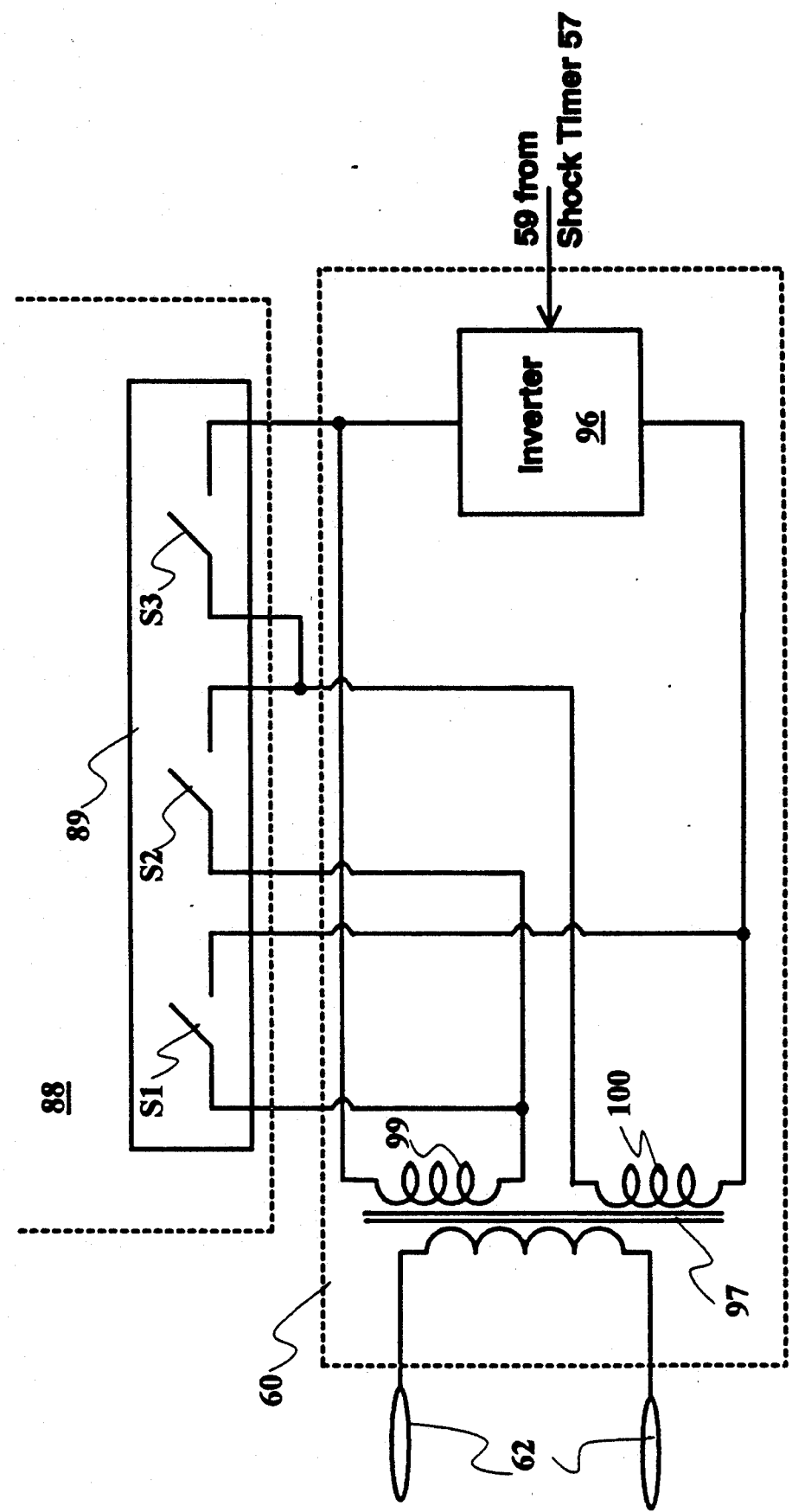
FIG. 3 is a schematic block diagram illustrating a preferred embodiment of that aspect of the invention providing for user adjustability of the intensity of an aversive stimulus administered to an animal.

As FIG. 3 illustrates, high voltage generator 60 may suitably include an inverter 96 which receives a D.C. input voltage from shock timer 57 and converts that input to an A.C. voltage which is applied to the primary side of a high voltage transformer 97. The secondary winding of transformer 97 is connected to electrodes 62. The primary of transformer 97 includes at least two windings, 99 and 100 which may be selectively operated in either a series configuration or in a parallel configuration depending upon the positions of three switches S1, S2 and S3 of the switch array 89 located within user-accessible compartment 88. In order to select application of an intense shock, as may be desired in the case where animal 12 is large and/or aggressive, primary windings 99 and 100 are connected mutually in parallel by closing switches S1 and S3 and opening switch S2 as illustrated. In cases where animal 12 tends to be smaller and/or more timid, a less intense shock can be selected by connecting primary windings 99 and 100 in series by opening switches S1 and S3 and closing switch S2. In the event a greater number of gradations of shock intensity are desired, the primary of transformer 99 may be provided with additional windings (not shown) whose operative configurations can be controlled by means of additional switches (not shown) associated with switch array 89. As an alternative, a switch network or potentiometer can be used to adjust the magnitude of the A.C. voltage delivered by inverter 96 in order to provide either stepwise or continuously variable adjustment of shock level intensity. In lieu of mechanical switches of the type illustrated, Hall-effect switches actuatable magnetically from the exterior of the housing 87 can also be used, as can other arrangements which will occur to those skilled in the art having benefit of these teachings.

Figure 4:
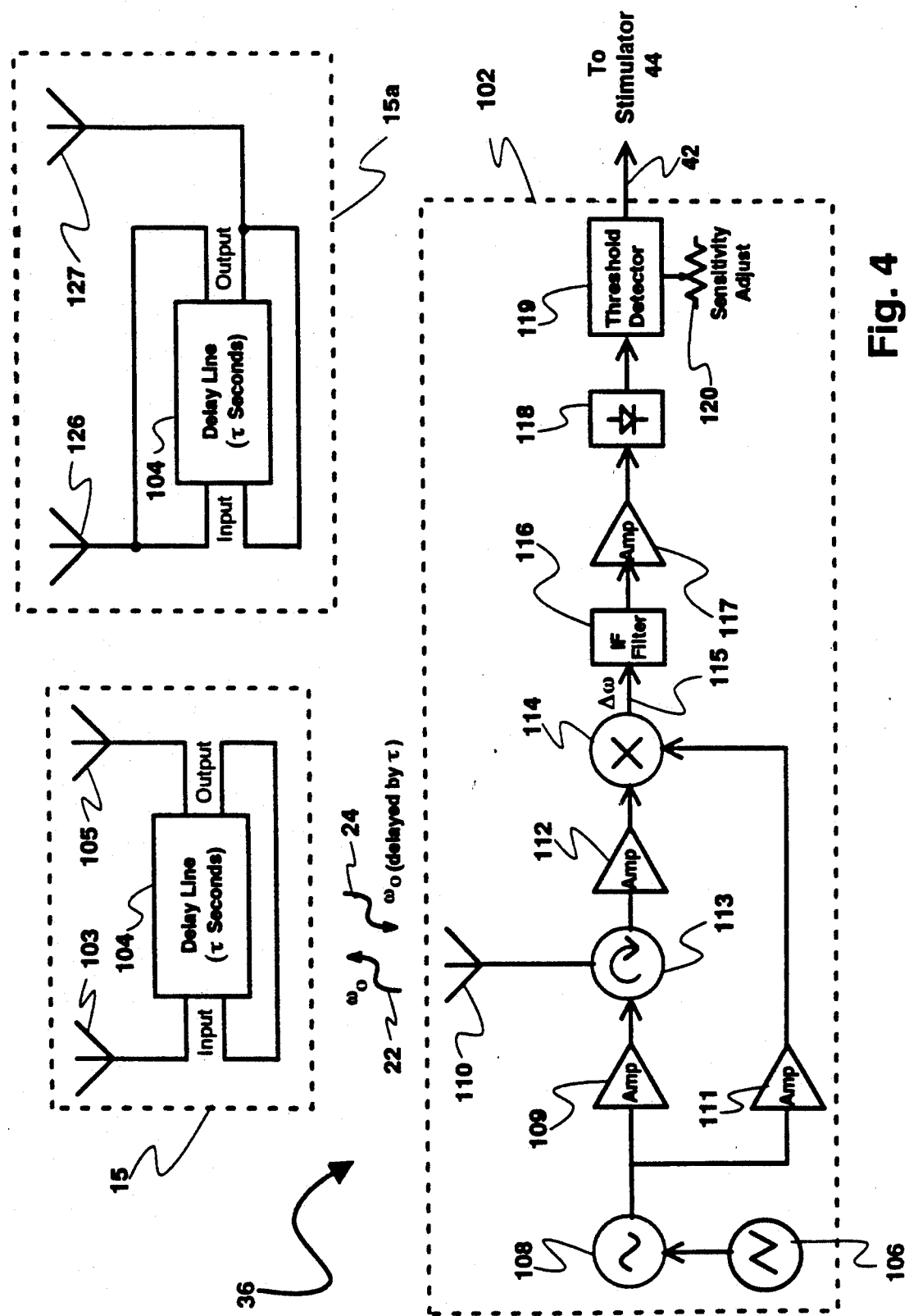
FIG. 4 is a schematic block diagram of a reflective signalling subsystem for use in an animal whereabouts control system according to the invention.

FIG. 4 illustrates a reflective signalling subsystem 36 in which the transmitter 27 and receiver 38 of FIG. 2 are combined in the form of a transceiver 102 and in which each transponder 15 or alternatively configured transponder 15a includes a delay line 104 for generating a return signal 24 which comprises a reflection of an incident signal 22 delayed by an interval $\tau$, which may suitably comprise about two microseconds. Delay line 104 may suitably comprise one such as a type 854299L1 available from Sawtek, Inc. of Orlando, Florida which includes double ended input and output terminals as shown. In one preferred form, transponder 15 has one input terminal and one output terminal of delay line 104 connected to a ground plane as illustrated while the remaining input and output terminals are coupled to separate antennae 103 and 105, respectively. A suitable mechanical construction for such a transponder 15 will be described hereinafter with reference to FIGS. 6A and 6B.

In lieu of or in addition to one or more transponders 15, the signalling subsystem of FIG. 4 may optionally include one or more alternative transponders 15a incorporating a delay line 104 of the type described above. A suitable mechanical construction for alternative transponder 15a will be described hereinafter with reference to FIGS. 7A and 7B. Like transponder 15, alternative transponder 15a is capable of receiving an incident signal 22 and generating and transmitting a return signal 24 in the form of a predeterminately time-delayed reflection of incident signal 22 in a manner which will be more thoroughly explained with reference to FIG. 5.

As illustrated in FIG. 5, both the incident signal 22 and return signal 24 may suitably take the form of sawtooth swept frequency signals. Incident signal 22 is continuously swept between frequencies $\omega_1$ and $\omega_2$ centered about a center frequency, $\omega_0$. Return signal 24 is of the same form except that it is time delayed by a predetermined time delay of $\tau$ seconds with respect to incident signal 24 due to the delay characteristics of delay line 104. Frequency $\omega_0$ may suitably be selected about 915 MHZ with $\omega_1$ and $\omega_2$ being selected at about 905 MHZ and 925 MHZ, respectively. Both signals 22 and 24 are swept at a rate given by EQUATION 1:

$$\frac{\Delta\omega}{\tau} = \frac{\omega_2 - \omega_1}{\tau_2 - \tau_1}$$

and, the instantaneous frequency difference between signals 22 and 24 will vary as a function of the predetermined time delay, $\tau$, imposed by delay line 104 according to EQUATION 2:

$$\Delta\omega = \left(\frac{\omega_2 - \omega_1}{\tau_2 - \tau_1}\right)\tau$$

Thus, transceiver 102 can detect return signal 24 by determining whether the magnitude of a signal correlated to $\Delta\omega$ falls within predetermined upper and lower limits and thus properly initiate the delivery of at least one aversive stimulus to animal 12.

In the reflective signalling subsystem 36 of FIG. 4, incident signal 22 is generated by means of a sawtooth FM modulation generator 106 which drives a voltage controlled oscillator 108. The output of voltage controlled oscillator 108 is applied to a pair of monolithic amplifiers 109 and 111, the former of which is connected to an antenna 110 by way of a circulator 113 for transmitting an incident signal 22 and receiving a return signal 24. Signals 22 and 24 may suitably be of the forms described above with reference to FIG. 5. Any return signal 24 received by antenna 110 is communicated via circulator 113 to an amplifier 112 whose output is applied to a balanced mixer 114 which also receives a sample of incident signal 22 by way of amplifier 111. Balanced mixer 114 generates a frequency difference signal 115 correlated to the frequency difference, $\Delta\omega$, between incident signal 22 and any signal, such as return signal 24, received by antenna 110. Signal 115 is bandlimited by an IF filter 116 to the particular frequency difference, $\Delta\omega$, expected between signals 22 and 24 per Equation 2 above based upon the predetermined time delay $\tau$ imposed by delay line 140. The output of filter 116 is amplified by an amplifier 117 whose output will assume a substantially zero value unless signal 24 is received by antenna 110. The output of amplifier 117 is rectified by a detector 118 whose output is in turn applied to a threshold detector 119 whose sensitivity may be adjusted by a potentiometer 120 which provides one means for adjusting the effective distance between each transponder 15 or 15a and its surrounding boundary 17. Whenever the input to threshold detector 119 exceeds the level established by potentiometer 120, return signal 24 is assumed to have been detected and the digital output signal 42, generated in this embodiment by the threshold detector 119 of transceiver 102, assumes its logical "1" or active state thereby activating stimulator 44 and initiating delivery of at least one aversive stimulus to animal 12. In order to avoid undue fluctuation in the state of digital output signal 42, threshold detector 119 preferably incorporates a conventional Schmitt trigger circuit (not shown) for providing the upper and lower thresholds with a hysteresis characteristic.

The structure of the reflective transponder 15 described earlier with reference to FIG. 4 will now be described further with reference to FIGS. 6A and 6B. In order to facilitate full or partial burial of transponder 15 for inconspicuous operation, delay line 104 may be suspended in potting compound or other suitable encapsulant 121 inside a housing 122 by means of antennas 103 and 105 which may suitably take the form of $\frac{1}{4}$ inch O.D. copper rods, each approximately $\frac{1}{4} \propto$ wavelength long and whose free ends are anchored in sealing end caps or plugs as shown. Housing 122 is preferably formed of a short length of rigid $1\frac{1}{4}$ inch O.D. plastic tube of PVC or other tough, inert material suitable for burial for extended periods without substantial degradation. To facilitate the burial and retention of transponder 15 in soil, housing 122 may advantageously be provided with a conical tip 124 and one or more annular barbs 125.

Figure 7B:
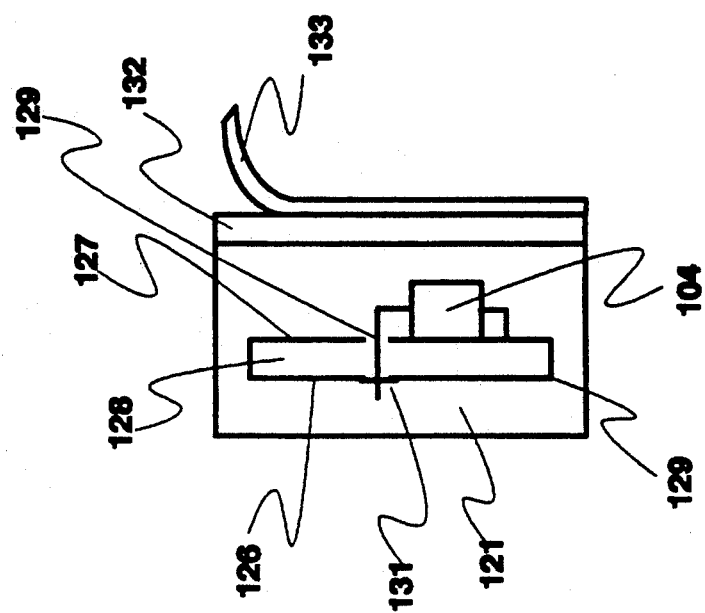
FIG. 7B is a side sectional view taken along line 7B—7B of FIG. 7A.
Figure 7A:
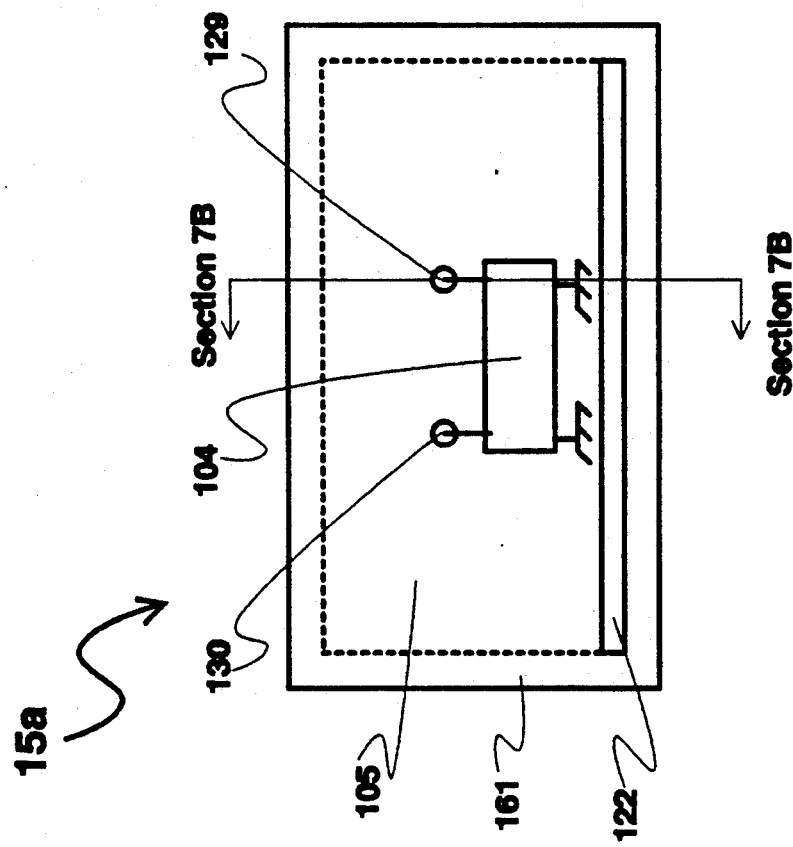
FIG. 7A is a plan view of a patch antenna transponder suitable for use in the reflective signalling subsystem of FIG. 4.

FIGS. 7A and 7B illustrate in further detail the structure of a suitable alternative reflective transponder 15a will now be described in further detail with reference to FIGS. 7A and 7B. The delay line 104 of transponder 15b may suitably be mounted adjacent the outwardly facing surface of one of a pair of rectangular copper plates comprising antennas and lying parallel to one another spaced apart by a layer 128 of dielectric material which preferably has a dielectric constant in the range of about 2.5 to about 10. Plates 126 and 127 preferably have dimensions of about $\frac{1}{4}$ wavelength or less by about $\frac{1}{4}$ wavelength, both wavelengths corresponding to the wavelength of the center frequency of signals 22 and 24 in the medium of dielectric layer 128. Plates 126 and 127 are joined together by a strip 129 of U-shaped cross section soldered or brazed along adjacent longitudinal edges of plates 126 and 127 are illustrated. One input and one output terminal of delay line 104 are connected in common to plate 127 while the remaining input and output terminals of delay line 104 pass through holes 129 and 130 bored through plate 127 and dielectric layer 128 and are connected in common to plate 126 by means of a pair of disks 131 whose peripheries are soldered or brazed to plate 126 and which each have a central opening for supporting the leads of delay line 104 through the central portion of holes 129 and 130 to prevent their contact with plate 127 in the vicinity of holes 129 and 130. For protection, transponder 15a may suitably be encased in potting compound or other suitable encapsulant 121. To facilitate surface mounting, transponder 15a may also be provided with a pressure-sensitive adhesive layer 132 and a peelable backing strip 133 in order to permit transponder 15a to be attached to furniture, cars, building members, or other fixed or mobile locations which animal 12 is to be deterred from approaching.

Figure 8:
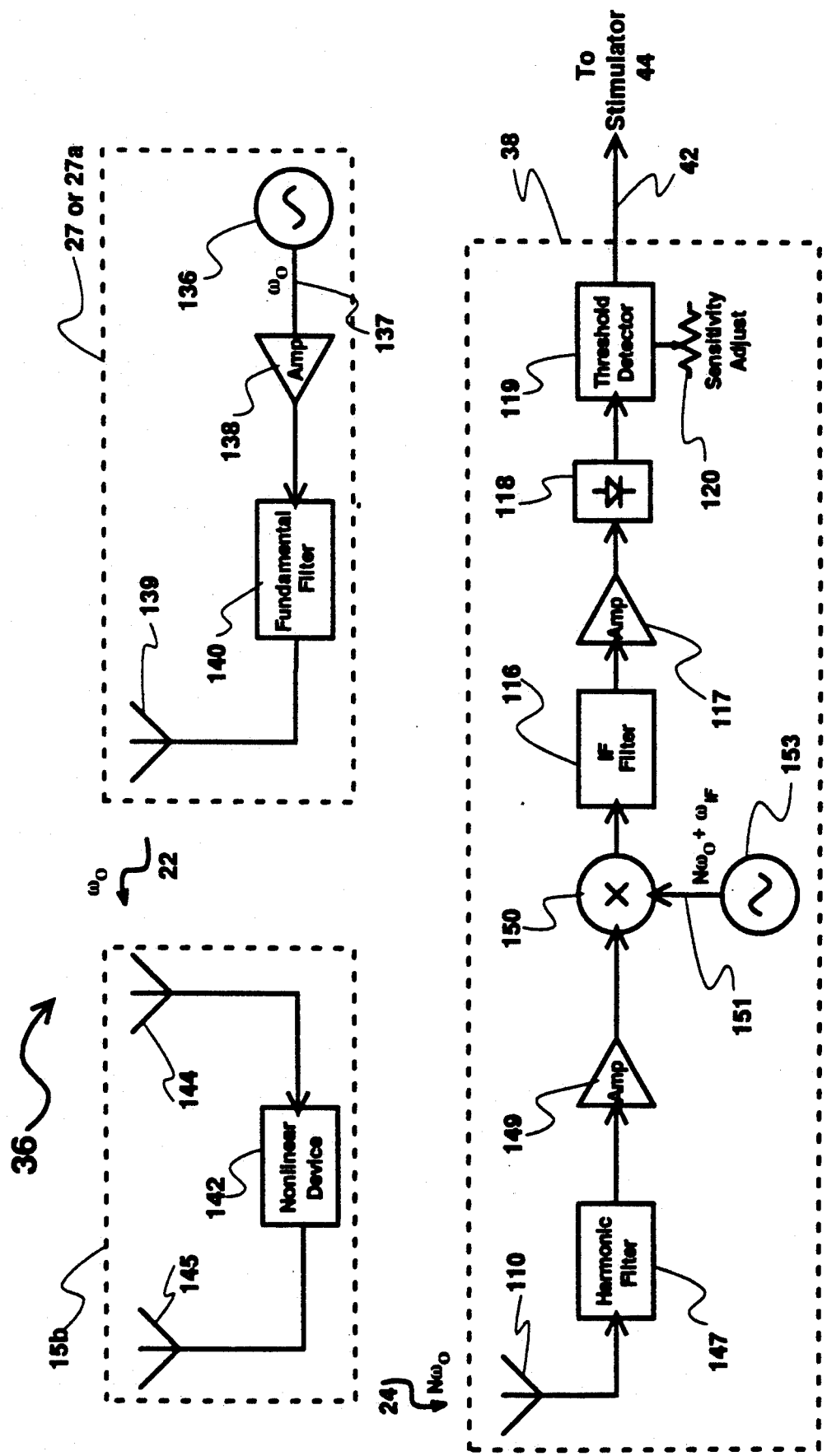
FIG. 8 is a schematic block diagram of a harmonic signalling subsystem for use in an animal whereabouts control system according to the invention.

FIG. 8 illustrates a second preferred embodiment of a signalling subsystem 36 wherein return signal 24 comprises a selected harmonic ($N\omega_O$) of a fundamental incident signal 22 of frequency $\omega_O$. According to this embodiment, transmitters 27 or 27a may suitably comprise an oscillator for generating an A.C. signal 137 at a fixed frequency, $\omega_O$, such as about 915 MHZ and applying same to an amplifier 138. To ensure that only a desired single-frequency incident signal 22 is transmitted, an antenna 139 of transmitter 27/27a is connected to a low pass fundamental filter 140 having passband including fundamental frequency $\omega_O$ but excluding harmonic frequency $N\omega_O$. According to this embodiment, transmitter 27 may be mounted integrally with the unit 13 affixed to pet 12 or a remote transmitter 27a may be provided according to the alternative construction described above with reference to FIGS. 1 and 2.

The transponder 15b of FIG. 8 may suitably comprise a nonlinear device 142 such as a microwave Schottky barrier diode or a zero-bias microwave diode having an impedance characteristic which varies nonlinearly as a function of amplitude. Nonlinear device 142 is connected to a receiving antenna 144 and a transmitting antenna 145. Upon receiving fixed-frequency incident signal 22, nonlinear device 142 generates and transmits via antenna 145 a plurality of harmonics of the fixed frequency signals, including a return signal 24 representing predetermined harmonic $N\omega_O$, such as the second harmonic of the fundamental of incident signal 22.

Receiver 38 which, in the embodiment of FIG. 8 comprises a superheterodyne receiver, includes an antenna 110 for receiving the harmonic return signal 24. In order to reject all harmonics except return signal 24 at predetermined harmonic, $N\omega_O$, antenna 110 is coupled to a high pass harmonic filter 147 whose transfer characteristic is the inverse of that of fundamental filter 132. That is, harmonic filter 147 is characterized by a pass band including the harmonic frequency $N\omega_O$ while excluding fundamental frequency $\omega_O$. The output of harmonic filter 147 is amplified by an RF amplifier 149 and applied to a mixer 150. Mixer 150 mixes the output of amplifier 149 with a local oscillator signal 151 of frequency generated by a local frequency oscillator 153, the output of mixer 150 is then passed through an intermediate frequency (IF) filter 116 for recovering harmonic $N\omega_O$ and an IF amplifier 117 whose output is coupled to a detector 118 and a threshold detector 119. Threshold detector 119 is coupled to a sensitivity adjustment potentiometer 120. Lowering the setting of potentiometer 120 has the effect of increasing the sensitivity of system 10, thus increasing the distance between each transponder 15b and its respective boundary 17 and vice-versa. Whenever the output of detector 118 exceeds the threshold level determined by the setting of potentiometer 120, the digital output signal 42 generated by threshold detector 150 assumes a logical "1" value thereby activating the stimulator 44 to which signal 42 is applied.

Where transmitter 27 and receiver 38 are each housed within unit 13, transmitter 27 and receiver 28 may be directly coupled to one another to facilitate reliable detection of return signal 24. An example of such a signalling subsystem 36 will now be described with reference to FIG. 9. As shown, a transmitter 27c and receiver 38 are each housed within the housing 87 of unit 13. Transmitter 27c may be identical to the transmitter 27 described with reference to FIG. 8, except that the output of amplifier 138 is connected to a directional coupler 157 which delivers a coherent sample of the fundamental signal $\omega_O$ to receiver 38. Receiver 38 includes a harmonic filter 147 as described earlier as well as a mixer 176 which mixes the output of harmonic filter 147 with a modulation signal 178 at a frequency $\omega_m$ generated by an oscillator 180 thereby adding sidebands to the harmonic signal at frequencies $N\omega_O \pm \omega_m$. The double sideband signal 183 produced by mixer 176 is amplified by an RF amplifier 185 and thereafter passed to a second mixer 187 where it is mixed with a signal 189 at frequency $N\omega_O$. The latter signal may conveniently be generated by passing the coherent sample picked up from transmitter 27 by directional coupler 157 through an N times multiplier 190. The output of mixer 187 is then passed through an IF filter 192 which substantially attenuates all frequencies except the sideband frequency $\omega_m$ and then is passed to an IF amplifier 117, a detector 118 and a threshold detector 119 having a sensitivity adjustment potentiometer 120 for generating digital output signal 42 in the manner described earlier in connection with the embodiments of FIGS. 4 and 8.

Figure 10:
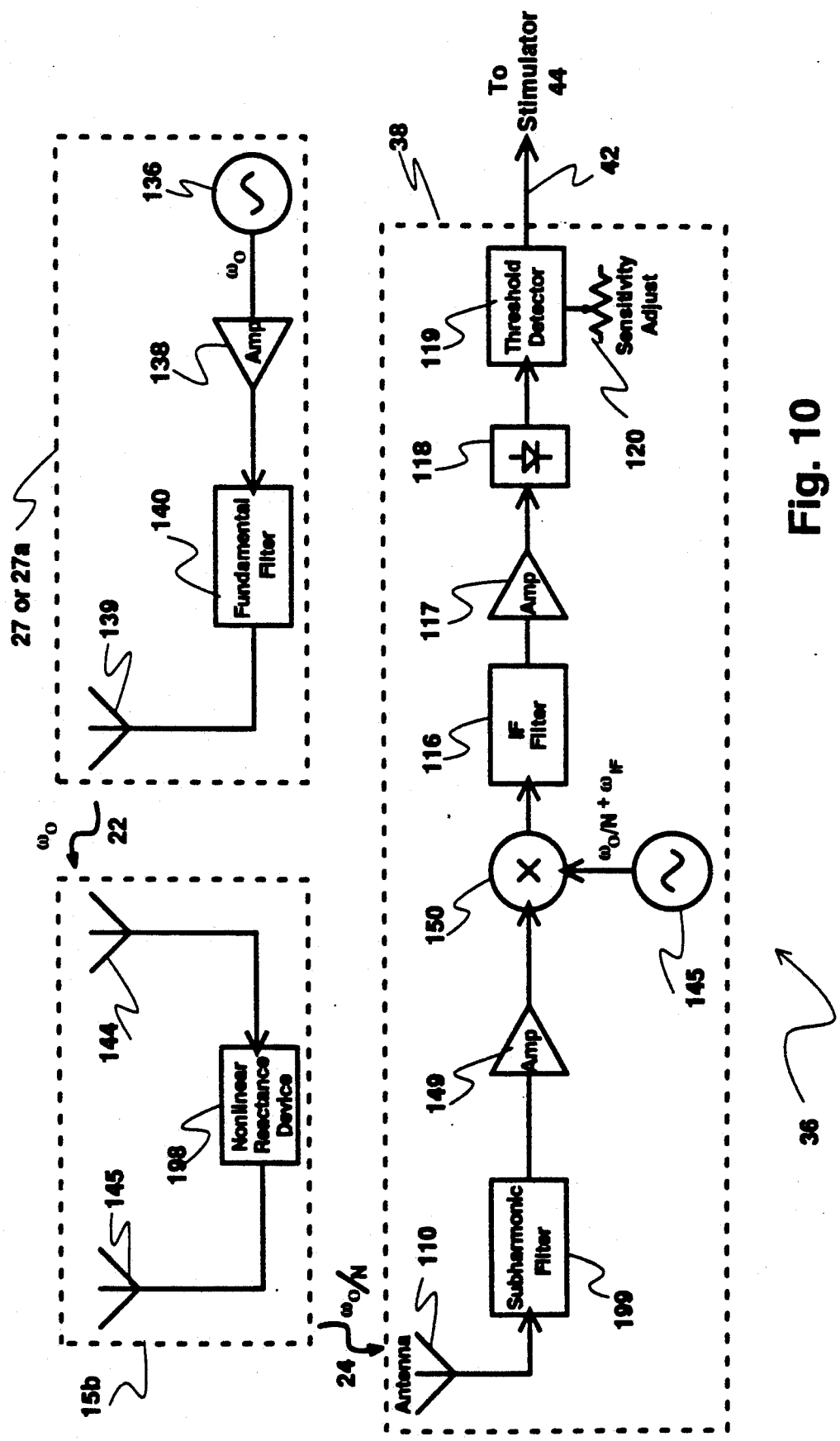
FIG. 10 is a schematic block diagram of a subharmonic signalling subsystem for use in an animal whereabouts control system according to the invention.

As illustrated in FIG. 10, system 10 may also include one or more transponders 15b comprising a nonlinear reactance device 198, such as a varactor, so that transponder 15b generates and transmits one or more selected subharmonics, $\omega_O/N$, of the incident signal 22 generated by transmitter 27 at fundatmental frequency $\omega_O$. In such event, a suitable receiver 38 may be of the substantially same form as that described earlier with reference to FIG. 8 except that a subharmonic filter 199 having a passband at $\omega_O/N$ is substituted for the harmonic filter 139 at FIG. 8. Consequently, the output of mixer 142 will be at a frequency of $(\omega_O/N) = \omega_{IF}$ rather than $N\omega_O + \omega_{IF}$, as in the case of the signalling subsystem of FIG. 8.

Figure 9:
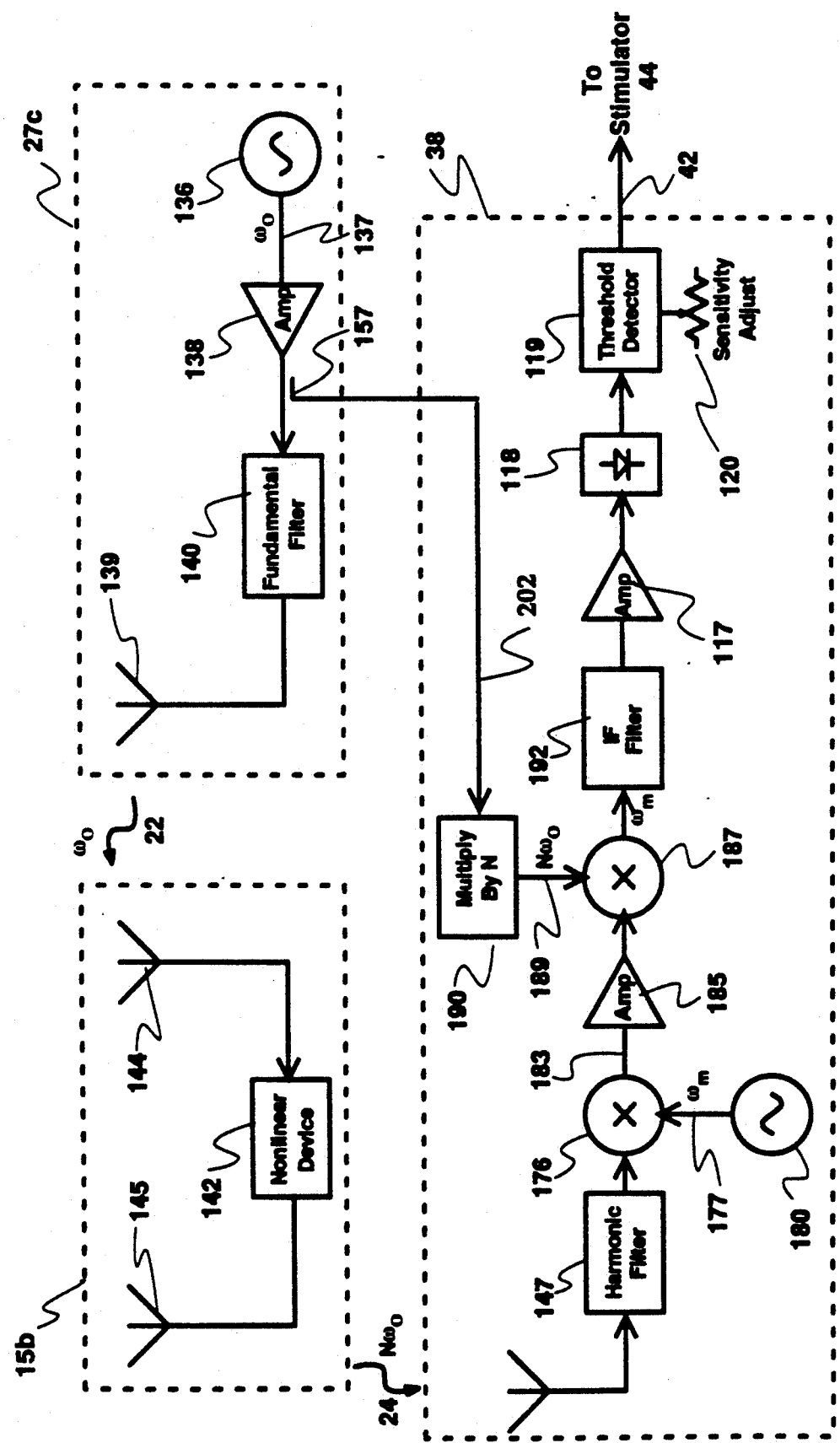
FIG. 9 is a schematic block diagram of a coherent sampling harmonic signalling subsystem for use in an animal whereabouts control system according to the invention.
Figure 11:
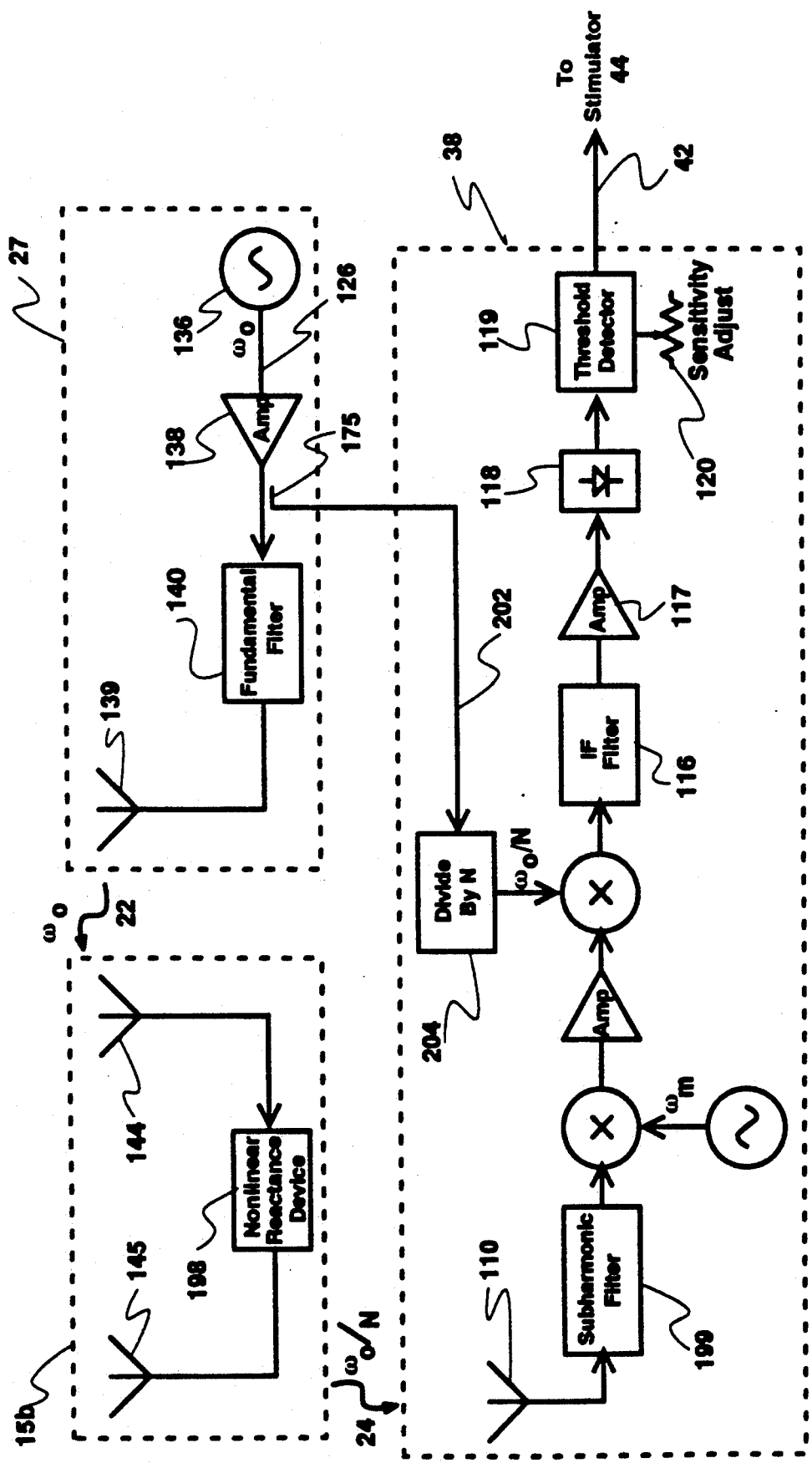
FIG. 11 is a schematic block diagram of a coherent sampling subharmonic signalling subsystem for use in an animal whereabouts control system according to the invention.

In cases where transmitter 27 and receiver 38 both form part of the unit 13 affixed to animal 12, reliable detection of a subharmonic signal generated by a transponder 15c incorporating a nonlinear reactance device 198 may be facilitated by communicating a coherent sample 202 of the fundamental signal from transmitter 27 to receiver 38 as illustrated in FIG. 11. The receiver 38 of FIG. 11 is similar to the receiver 38 of FIG. 9, except that the coherent sample 202 from the transmitter 27 of FIG. 11 is divided by N by a divider 204 rather than being multiplied by N and the harmonic filter 139 of FIG. 9 is replaced by a subharmonic filter 199 whose transfer function selectively passes signals at frequency $\omega_O/N$. Thus, oscillator 136 serves as a local oscillator common to both transmitter 27 and receiver 38. This reduces the possibility of errors in detecting return signal 24 which could otherwise result in systems having a transmitter and receiver with independent local oscillators. Otherwise, the structure and operation of the receiver 38 of FIG. 11 is analogous to that of the receiver 38 of FIG. 9.

The transponders 15b of FIGS. 8 through 11 may assume a number of alternative configurations. As illustrated in FIG. 12A, nonlinear device 142 may suitably comprise a diode 15 having its anode and cathode connected to respective arms 203 and 206 of a two-armed archimedian spiral antenna. While the transponder 15b of FIG. 12A may be formed as a thin wafer and provided with a pressure sensitive adhesive backing or other suitable attachment means (not shown), transponders 15 intended for burial can be provided with a reflective cavity backing 201 of metal foil, metal-coated plastic or other suitable material as illustrated in FIG. 12B such that energy of return signal 24 which would otherwise be radiated downwardly into the earth can be reflected upwardly to provide for more positive detection of return signal 24. Alternatively, and as illustrated in FIG. 12C, the structure of FIG. 12A can be made to radiate return signal 24 in a preferred direction without need of providing a reflective cavity backing. This can be accomplished by arranging spiral arms 203 and 206 in a conical configuration as shown in FIG. 12C. The design of two-arm cavity-backed planar and conical spiral antennas suitable for incorporation in transponder 15b is described further in the Antenna Engineering Handbook, second edition, published by McGraw-Hill Book Company and edited by Richard C. Johnson and Henry Jasik at pages 14-1 through 14-18 which are expressly incorporated herein by reference in their entirety.

By altering the size and shape of antenna elements 203 and 206 the effective gain of transponder 15b can be adjusted. By so doing, different transponders 15b having different effective gains, and thus, different distances between themselves and their respective boundaries 17, can be provided within a single system 10. This option is illustrated in FIG. 1 which shows the boundaries 17 associated with the transponders 15 at indoor locations A and B being closer to their respective transponders 15 than the boundaries 17 associated with the transponders 15 forming perimeter boundary 33. This provides system 10 with the flexibility to form well-defined boundaries in particular localized areas while at the same time permitting large perimeter boundaries, such as perimeter boundary 33, to be formed without requiring an excessive number of transponders 15.

Figure 13:
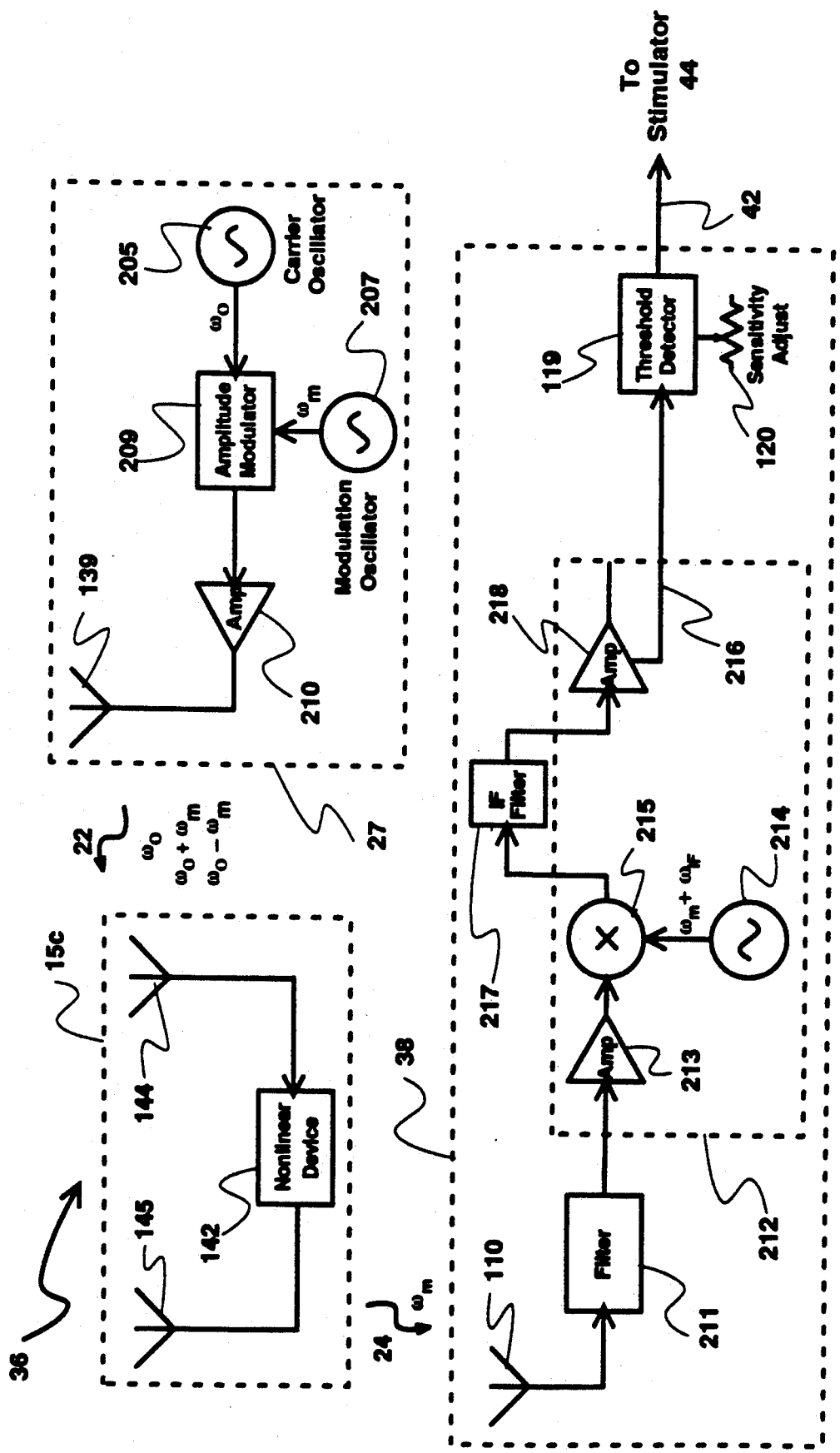
FIG. 13 is a schematic block diagram of an amplitude modulation signalling subsystem for use in an animal whereabouts control system according to the invention.

As illustrated in FIG. 13, signalling subsystem 36 may alternatively take the form of a double sideband amplitude modulation system. According to this alternative embodiment, transmitter 27 includes a carrier oscillator 205 for generating a carrier frequency at desired frequency $\omega_O$ and a modulation oscillator 207 for generating a modulation signal at a frequency $\omega_m$. These carrier and modulation signals are applied to an amplitude modulator 209, amplified by an amplifier 210, and transmitted by an antenna 139 in the form of an incident signal 22 having a carrier component centered at $\omega_O$, an upper sideband component centered at $\omega_{O+\omega m}$ and a lower sideband component centered at $\omega_{O-\omega m}$. When such incident signal 22 is received by the antenna 144 of a transponder 15c incorporating a nonlinear device 142 such as a microwave Schottky barrier diode, transponder 15 generates and transmits via an antenna 145, a return signal 24 at frequency $\omega_m$. According to this embodiment, receiver 38 comprises a receiving antenna 110 coupled to a bandpass filter 211 having its passband centered at $\omega_m$ and whose output may suitably be processed by an integrated circuit 212 such as a low power IF/AF integrated circuit for frequency modulation, type SL6654 manufactured by Plessey Semiconductors of Irvine, California. Integrated circuit 212 includes an amplifier 213 and an oscillator 214 coupled to a mixer 215. Mixer 215 is coupled to an external IF filter 217 for detecting the presence of a return signal 24 at frequency $\omega_m$. Integrated circuit 212 further includes an amplifier 218 which receives the output of filter 217 and generates a DC received signal strength indication (RSSI) output 216 which is passed to a threshold detector 119 having a sensitivity adjustment potentiometer 120 in order to generate a digital output signal 42 to stimulator 44, all as previously described.

Figure 14:
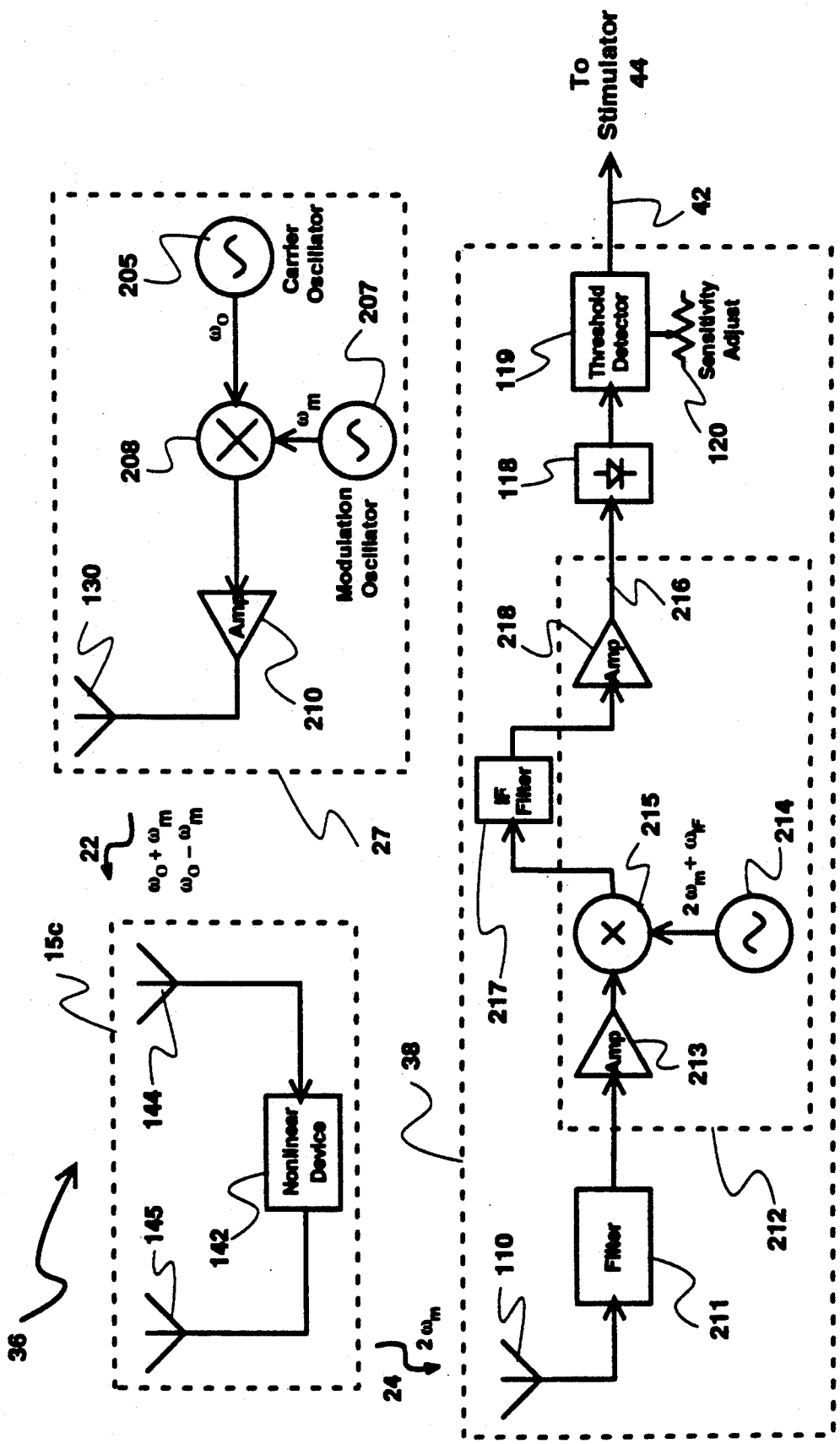
FIG. 14 is a schematic block diagram of a double sideband suppressed carrier signalling subsystem for use in an animal whereabouts control system according to the invention.

FIG. 14 illustrates a double sideband, suppressed carrier signalling subsystem 36. According to this embodiment, a carrier signal at frequency $\omega_O$ and modulation signal at frequency $\omega_m$ are applied to a balanced mixer 208 prior to being amplified by an amplifier 210 and transmitted by an antenna 130. In so doing, the carrier frequency $\omega_O$ is suppressed and substantially the entirety of the power of the incident signal 22 is transmitted in the upper and lower sideband signals, thereby enhancing the efficiency of system 10.

Upon receiving an incident signal 24 of such form, the nonlinear device 142 of transponder 15 generates and transmits a return signal 24 at a frequency $2\omega_m$. The structure and receiver 38 are analogous to those of the receiver 38 described above with reference to FIG. 13 except 212 is tuned to a passband at $2\omega_m$ rather than at $\omega_m$ and the oscillator 214 associated with integrated circuit 212 is tuned to a frequency of $2\omega_{m+\omega IF}$, rather than $\omega_{m+\omega IF}$ as in the embodiment of FIG. 13.

Figure 15:
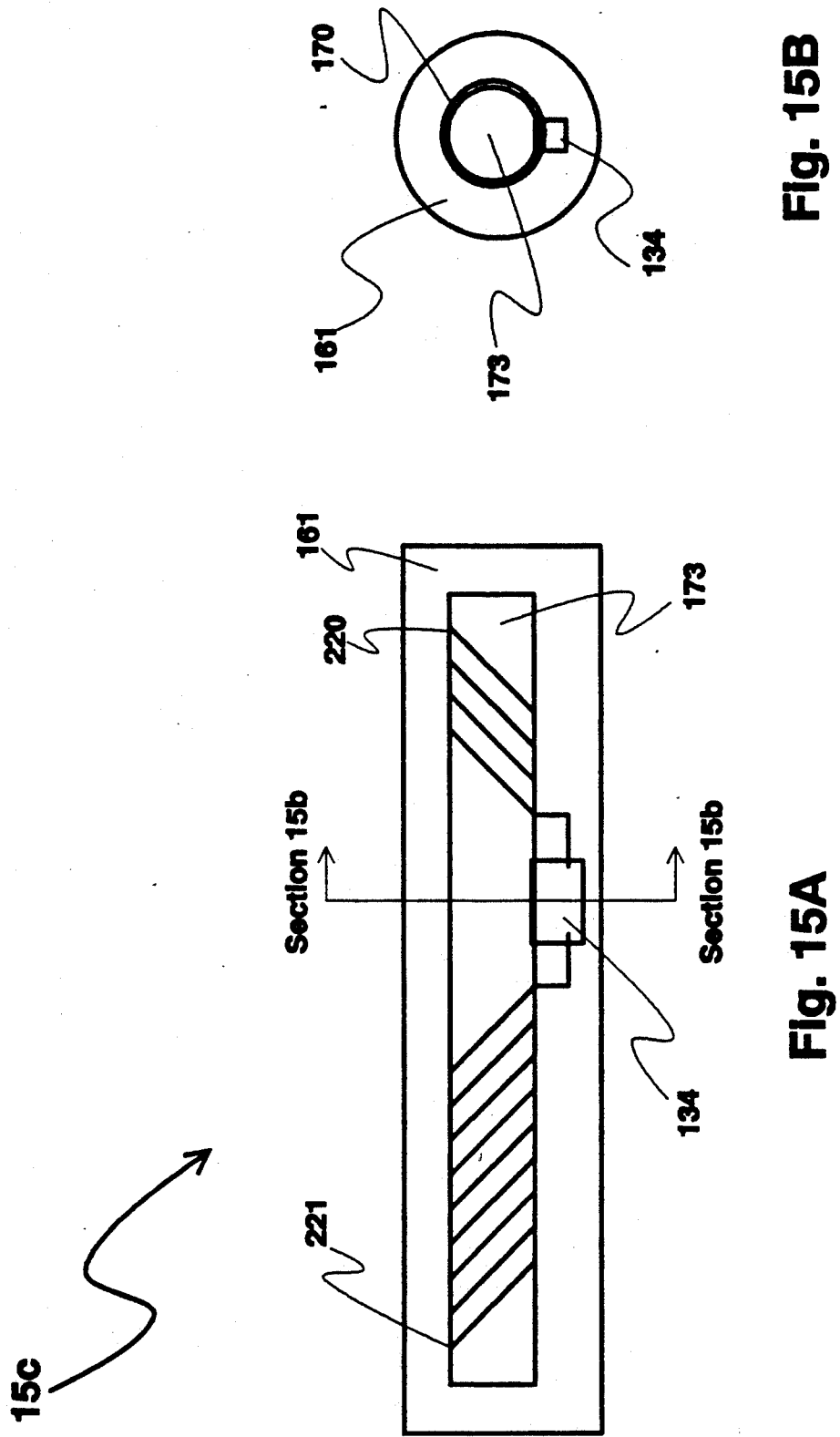
FIG. 15A is a diagrammatic side sectional view of an alternative narrowband nonlinear passive transponder with ferrite rod antenna suitable for use with the modulation signalling subsystems shown in FIGS. 13 and 14.
FIG. 15B is a sectional view taken along line 15b—15b of FIG. 15A.

Another alternative version of a transponder 15c for narrowband operation and which is particularly useful for low frequency operation such as in the embodiments of FIGS. 13 and 14 is illustrated in FIGS. 15A and 15B. According to this alternative embodiment, a nonlinear device 142 is provided with terminal leads forming a pair of coils 220, 221 wrapped around a cylindrical ferrite core 173 as illustrated with core 173, nonlinear device 142 and coils 220 and 221 all being subsequently embedded in potting compound or other suitable encapsulant 161. Preferably, coil 220 is tuned to fundamental frequency $\omega_O$ and coil 221 is tuned to the modulation frequency $\omega_m$ or $2\omega_m$, as the case may be.

Figure 16:
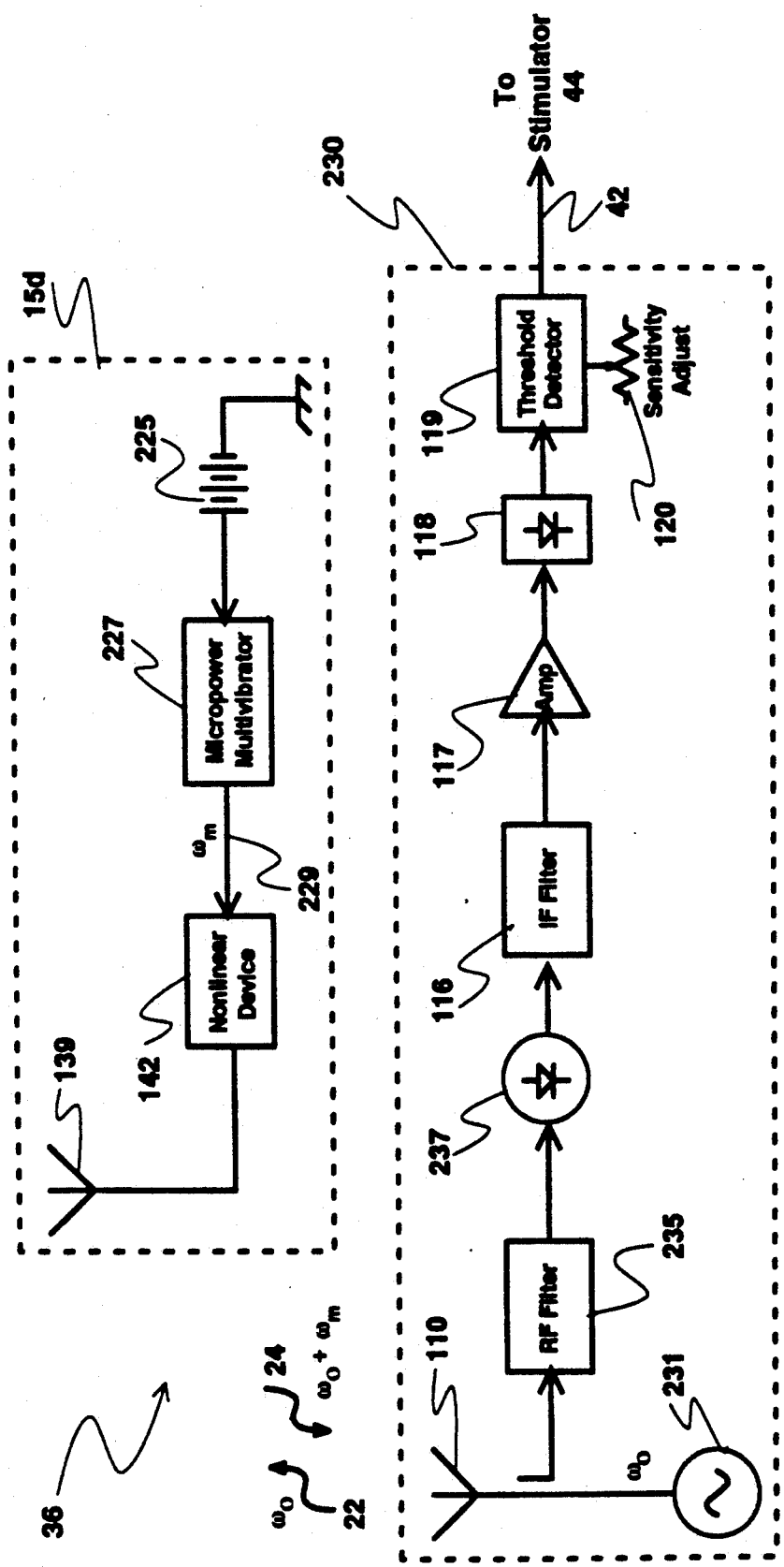
FIG. 16 is a schematic black diagram of an active transponder signalling subsystem for use in an animal whereabouts control system according to the invention.

While transponder 15 preferably comprises a passive transponder, an active transponder 15d powered by a battery 225 may also be used in a system 10 consistently with the broad aspects of the present invention. As illustrated in FIG. 16, a transponder 15d of an active type may suitably comprise a battery 225 connected to a micropower multivibrator 227, such as a CMOS type 555 timer connected in an astable configuration for generating a low power signal 229 at a desired modulation frequency $\omega_m$. The output of multivibrator 227 is applied to a nonlinear device 142, such as a microwave Schottky barrier diode connected to an antenna 139. A homodyne transceiver 230 having an antenna 110 connected to an oscillator 231 for generating an incident signal 24 at a frequency $\omega_O$ such as 915 MHz which is transmitted by an antenna 110. When animal 12 brings the unit 13 to which transceiver 230 is affixed within sufficient proximity of an active transponder 15d associated with system 10, active transponder 15d receives incident signal 22 and, by operation of nonlinear device 142, generates a return signal 24 at a frequency of $\omega_{O+\omega m}$. Return signal 24 is received by transceiver 230 which detects return signal 24 in conventional homodyne fashion by means of an RF filter 235, a mixer 237, an IF filter 116 and an IF amplifier 117 configured as shown. The output of IF amplifier 117 is then rectified by a detector 118 whose output is delivered to a threshold detector 119 of the type previously described having a sensitivity adjustment potentiometer 120. In response to detecting return signal 24, threshold detect 150 activates the signal 42 applied to stimulator 44 in the manner described above with reference to FIG. 2 to administer at least one aversive stimulus to animal 2, thereby deterring animal 12 from traversing the boundary established by transponder 15a.

While the foregoing constitute preferred embodiments of the present invention, it is to be understood that the invention is not limited thereby and that in light of the present disclosure, various alternative embodiments will be apparent to persons skilled in the art. Accordingly, it is to be recognized that changes can be made without departing from the scope of the invention as particularly pointed out and distinctly claimed in the claims set forth below including all legal equivalents thereof.

What is claimed is:

1. A system for controlling the whereabouts of an animal, said system comprising:
    (a) at least one transponder operable to receive a first signal and, in response to receiving said first signal, to transmit a second signal distinguishable from said first signal, said at least one transponder being positionable to define the location of a boundary for the animal;
    (b) a transmitter for transmitting said first signal;
    (c) a receiver for receiving said second signal and for detecting a condition of said second signal indicating proximity of the animal to said boundary; and
    (d) a stimulator responsive to said receiver for administering to the animal, in response to said detecting of said condition, at least one stimulus for deterring the animal from traversing said boundary in order to control the whereabouts of the animal.

2. The system of claim 1 wherein said transponder comprises a passive transponder capable of deriving from said first signal substantially all energy required to transmit said second signal.

3. The system of claim 1 further comprising a timer for limiting the length of time said stimulus is delivered to the animal.

4. The system of claim 1 further comprising means for affixing said receiver to the animal.

5. The system of claim 1 wherein said transmitter is mounted remotely from the animal and transmits said first signal at an energy level sufficiently high that said first signal is received and said second signal is generated by substantially every transponder in said system irrespective of the whereabouts of the animal.

6. The system of claim 1 wherein said at least one transponder comprises a two terminal element having a non-linear characteristic.

7. The system of claim 6 wherein said element comprises a varactor and said second signal comprises at least one predetermined subharmonic of said first signal.

8. The system of claim 6 wherein said element comprises a diode.

9. The system of claim 1 wherein said at least one transponder comprises a delay device for generating said second signal in the form of a predeterminately time-delayed representation of said first signal.

10. The system of claim 1 wherein said at least one transponder comprises an active transponder in which at least a portion of the energy of said second signal is derived from a battery connected directly to said transponder.

11. The system of claim 1 further comprising user-accessible stimulation intensity adjustment means, coupled to said stimulator, for permitting a user of the system to adjust the intensity of said stimulus.

12. The system of claim 1 wherein said transmitter and said receiver comprise a common local oscillator whereby frequency drift between said transmitter and said receiver is avoided, thus improving reliability of operation of the system.

13. The system of claim 1 further comprising: motive activity responsive means for sensing motive activity and inactivity the animal, for deenergizing at least a portion of at least one of:
   (i) said transmitter;
   (ii) said receiver, and
   (iii) said stimulator
in response to sensing said motive inactivity and for reenergizing same in response to sensing said motive activity.

14. The system of claim 13 wherein said motive activity responsive means includes a timer for delaying the onset of at least one of said deenergizing and said reenergizing.

15. The system of claim 1 wherein said first signal comprises a low duty cycle signal.

16. In an animal whereabouts control system of a type including one or more battery-powered circuits affixed to the animal during operation of the system, the improvement comprising:
   (a) a resettable timer which times out a period of time after being reset, said timer being coupled to at least one of said one or more circuits for deenergizing said one or more circuits when said timer times out, and
   (b) a motion detector mechanically coupled to the animal to detect movement of the animal, said motion detector being connected to said timer so as to reset said timer in response to said movement while permitting said timer to time out and deenergize said at least one of said one or more circuits if said movement is not detected within said period of time of the most recent resetting of said timer whereby battery power is conserved when the animal is inactive.

* * * * *